(12) United States Patent
Hersh et al.

(10) Patent No.: US 9,817,637 B2
(45) Date of Patent: Nov. 14, 2017

(54) METHODS AND SYSTEMS FOR PROVIDING ENHANCEMENTS TO A BUSINESS NETWORKING FEED

(75) Inventors: Jonathan Hersh, San Francisco, CA (US); Helder Rocha, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 1036 days.

(21) Appl. No.: 13/172,756

(22) Filed: Jun. 29, 2011

(65) Prior Publication Data

US 2012/0059795 A1 Mar. 8, 2012
US 2012/0239619 A9 Sep. 20, 2012

Related U.S. Application Data

(60) Provisional application No. 61/360,855, filed on Jul. 1, 2010.

(51) Int. Cl.
G06F 17/30 (2006.01)
G06F 7/78 (2006.01)

(52) U.S. Cl.
CPC ..................................... *G06F 7/78* (2013.01)

(58) Field of Classification Search
CPC .................................................. G06F 17/30864

(Continued)

(56) References Cited

U.S. PATENT DOCUMENTS 5,577,188 A 11/1996 Zhu
5,608,872 A 3/1997 Schwartz et al.
(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Robert Beausoliel, Jr.
*Assistant Examiner* — Alexandria Bromell
(74) *Attorney, Agent, or Firm* — Weaver Austin Villeneuve & Sampson LLP

(57) ABSTRACT

Methods, systems, and apparatus facilitate social and business networking in a multi-tenant database. An application can provide each user with the ability view targeted data of interest. The data of interest can be supplied in a feed associated with the user created list, which compiles the feed items, e.g., comments, posts, stories, etc., of the object feeds subscribed to by the list. Lists can include entity feeds of objects, on the database well as child records associated with those objects. Accordingly, a user can create tailored feeds and can organize related information into feed for that list. In further embodiments, applications are provided which allow users are able to view filtered selections of other users and objects on the database system. In one embodiments, a connector application allows users to modify subscriptions to other users and objects, a dashboard application allows users to view user profiles and analytics regarding the user profile, and a search application allows users to perform field based searches on the records of the users and objects. Additional applications which allow users to navigate and view records on the database system are also provided.

17 Claims, 20 Drawing Sheets

(58) Field of Classification Search
USPC .................................................. 707/628
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,839,680 B1 | 1/2005 | Liu et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,620,697 B1 | 11/2009 | Davies |
| 7,644,122 B2 | 1/2010 | Weyer et al. |
| 7,668,861 B2 | 2/2010 | Steven |
| 7,669,123 B2 | 2/2010 | Zuckerberg et al. |
| 7,676,542 B2 | 3/2010 | Moser et al. |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,818,659 B2 | 10/2010 | Kahn et al. |
| 7,827,208 B2 | 11/2010 | Bosworth et al. |
| 7,849,114 B2 | 12/2010 | Boss et al. |
| 7,853,881 B1 | 12/2010 | Assal et al. |
| 7,881,983 B2 | 2/2011 | Pitkow |
| 7,933,884 B2 | 4/2011 | Menezes et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,037,093 B2 | 10/2011 | Tiu, Jr. et al. |
| 8,060,634 B1 | 11/2011 | Darnell et al. |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,145,678 B2 | 3/2012 | Ramsay, Jr. et al. |
| 8,150,913 B2 | 4/2012 | Cheah |
| 8,200,775 B2 | 6/2012 | Moore |
| 8,209,286 B2 * | 6/2012 | Henderson ............ G06F 21/604 707/628 |
| 8,209,308 B2 | 6/2012 | Rueben et al. |
| 8,209,333 B2 | 6/2012 | Hubbard et al. |
| 8,250,096 B2 | 8/2012 | Su et al. |
| 8,275,836 B2 | 9/2012 | Beaven et al. |
| 8,335,763 B2 | 12/2012 | Narayanan et al. |
| 8,352,499 B2 | 1/2013 | Bharat et al. |
| 8,355,955 B1 | 1/2013 | Mirchandani et al. |
| 8,380,716 B2 | 2/2013 | Mirus |
| 8,380,803 B1 | 2/2013 | Stibel et al. |
| 8,457,545 B2 | 6/2013 | Chan |
| 8,478,722 B2 | 7/2013 | Lee et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,516,591 B2 | 8/2013 | Fly et al. |
| 8,533,719 B2 | 9/2013 | Fedorova et al. |
| 8,560,554 B2 | 10/2013 | Gradin et al. |
| 8,566,301 B2 | 10/2013 | Rueben et al. |
| 8,646,103 B2 | 2/2014 | Jakobson et al. |
| 8,682,918 B2 | 3/2014 | Ramanujam |
| 8,693,649 B2 | 4/2014 | Casalaina et al. |
| 8,700,738 B2 * | 4/2014 | Moore ................ G06F 17/3089 709/203 |
| 8,713,530 B2 | 4/2014 | Waite et al. |

(56) References Cited

U.S. PATENT DOCUMENTS

| | | | |
|---|---|---|---|
| 8,718,241 B2 | 5/2014 | Casalaina et al. | |
| 8,738,603 B2 | 5/2014 | Fischer | |
| 8,756,221 B2 | 6/2014 | Prabaker et al. | |
| 8,818,985 B2 | 8/2014 | Fischer et al. | |
| 8,838,834 B2 | 9/2014 | Reynolds | |
| 9,031,957 B2 | 5/2015 | Agrawal et al. | |
| 9,208,187 B2 | 12/2015 | Dunn | |
| 9,443,224 B2 | 9/2016 | Dunn et al. | |
| 9,443,225 B2 | 9/2016 | Olsen et al. | |
| 9,659,049 B2 | 5/2017 | Dunn | |
| 2001/0044791 A1 | 11/2001 | Richter et al. | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0131070 A1 | 7/2003 | Stroebel et al. | |
| 2003/0135543 A1 | 7/2003 | Kittredge et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0111467 A1 | 6/2004 | Willis | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0066335 A1 | 3/2005 | Aarts | |
| 2005/0091098 A1 | 4/2005 | Brodersen et al. | |
| 2005/0193143 A1 | 9/2005 | Meyers et al. | |
| 2005/0267973 A1 | 12/2005 | Carlson et al. | |
| 2006/0101422 A1 | 5/2006 | Bourges-Waldegg et al. | |
| 2006/0112076 A1 | 5/2006 | Burris et al. | |
| 2006/0240856 A1 | 10/2006 | Counts et al. | |
| 2006/0253459 A1 | 11/2006 | Kahn et al. | |
| 2006/0256937 A1 | 11/2006 | Foreman et al. | |
| 2006/0265396 A1 | 11/2006 | Raman et al. | |
| 2007/0022174 A1* | 1/2007 | Issa | H04L 67/104 709/217 |
| 2007/0043766 A1 | 2/2007 | Nicholas et al. | |
| 2007/0061266 A1 | 3/2007 | Moore et al. | |
| 2007/0083536 A1* | 4/2007 | Darnell | G06F 17/30867 |
| 2007/0204308 A1* | 8/2007 | Nicholas | H04N 7/17318 725/86 |
| 2007/0208687 A1 | 9/2007 | O'Conor et al. | |
| 2007/0214097 A1 | 9/2007 | Parsons et al. | |
| 2008/0010337 A1 | 1/2008 | Hayes et al. | |
| 2008/0040673 A1 | 2/2008 | Zuckerberg et al. | |
| 2008/0065701 A1 | 3/2008 | Lindstrom et al. | |
| 2008/0114888 A1* | 5/2008 | Bhatt | H04L 63/1416 709/231 |
| 2008/0126476 A1* | 5/2008 | Nicholas | G06Q 10/10 709/203 |
| 2008/0155112 A1* | 6/2008 | Ma | H04L 12/1859 709/231 |
| 2008/0177597 A1* | 7/2008 | Moore | C12Q 1/6888 705/7.38 |
| 2008/0222615 A1 | 9/2008 | Bourges-Waldegg et al. | |
| 2008/0229215 A1 | 9/2008 | Baron et al. | |
| 2008/0249972 A1 | 10/2008 | Dillon | |
| 2008/0275884 A1 | 11/2008 | Yoshida et al. | |
| 2009/0049053 A1 | 2/2009 | Barker et al. | |
| 2009/0063294 A1 | 3/2009 | Hoekstra et al. | |
| 2009/0063415 A1 | 3/2009 | Chatfield et al. | |
| 2009/0077124 A1* | 3/2009 | Spivack | G06Q 30/02 |
| 2009/0100342 A1 | 4/2009 | Jakobson | |
| 2009/0160658 A1 | 6/2009 | Armstrong et al. | |
| 2009/0164267 A1 | 6/2009 | Banatwala et al. | |
| 2009/0172773 A1 | 7/2009 | Moore | |
| 2009/0177484 A1 | 7/2009 | Davis et al. | |
| 2009/0177744 A1 | 7/2009 | Marlow et al. | |
| 2009/0192965 A1 | 7/2009 | Kass et al. | |
| 2009/0222750 A1 | 9/2009 | Jain et al. | |
| 2009/0234909 A1 | 9/2009 | Strandell et al. | |
| 2009/0248883 A1 | 10/2009 | Suryanarayana et al. | |
| 2009/0259717 A1 | 10/2009 | Kreiner et al. | |
| 2009/0282002 A1 | 11/2009 | Reeder et al. | |
| 2009/0288001 A1 | 11/2009 | Hamilton, II et al. | |
| 2009/0292773 A1 | 11/2009 | Leedberg et al. | |
| 2009/0319909 A1 | 12/2009 | Hsueh et al. | |
| 2010/0010987 A1* | 1/2010 | Smyth | G06F 17/30867 707/E17.014 |
| 2010/0057682 A1 | 3/2010 | Ramsay et al. | |
| 2010/0064015 A1* | 3/2010 | Sacks | G06Q 10/10 709/206 |
| 2010/0083124 A1 | 4/2010 | Druzgalski et al. | |
| 2010/0114946 A1 | 5/2010 | Kumar et al. | |
| 2010/0121831 A1* | 5/2010 | Lin | G06F 17/3089 707/706 |
| 2010/0144318 A1 | 6/2010 | Cable | |
| 2010/0146054 A1 | 6/2010 | Armstrong et al. | |
| 2010/0159995 A1 | 6/2010 | Stallings et al. | |
| 2010/0169159 A1 | 7/2010 | Rose et al. | |
| 2010/0179915 A1* | 7/2010 | Nastacio | G06Q 50/01 705/319 |
| 2010/0179987 A1* | 7/2010 | Sebastian | H04L 12/1859 709/203 |
| 2010/0205169 A1* | 8/2010 | Narayan | G06F 17/3089 707/711 |
| 2010/0223097 A1 | 9/2010 | Kramer et al. | |
| 2010/0241579 A1 | 9/2010 | Bassett et al. | |
| 2010/0268830 A1 | 10/2010 | McKee et al. | |
| 2010/0306146 A1 | 12/2010 | Brown et al. | |
| 2010/0312842 A1 | 12/2010 | Ladouceur et al. | |
| 2010/0325107 A1 | 12/2010 | Kenton et al. | |
| 2011/0004831 A1* | 1/2011 | Steinberg | H04N 21/454 715/753 |
| 2011/0066664 A1 | 3/2011 | Goldman et al. | |
| 2011/0072116 A1 | 3/2011 | Kordun et al. | |
| 2011/0087534 A1 | 4/2011 | Strebinger et al. | |
| 2011/0093478 A1 | 4/2011 | Starks et al. | |
| 2011/0113071 A1* | 5/2011 | Lee | G06Q 10/10 707/802 |
| 2011/0137894 A1 | 6/2011 | Narayanan et al. | |
| 2011/0145881 A1 | 6/2011 | Hartman et al. | |
| 2011/0153595 A1 | 6/2011 | Bernstein et al. | |
| 2011/0153646 A1 | 6/2011 | Hong et al. | |
| 2011/0161444 A1 | 6/2011 | Chauhan | |
| 2011/0173283 A1 | 7/2011 | Puthenkulam et al. | |
| 2011/0173570 A1 | 7/2011 | Moromisato et al. | |
| 2011/0179020 A1* | 7/2011 | Ozzie | G06F 17/3089 707/723 |
| 2011/0179378 A1 | 7/2011 | Wheeler et al. | |
| 2011/0209069 A1 | 8/2011 | Mohler | |
| 2011/0218958 A1 | 9/2011 | Warshavsky et al. | |
| 2011/0225146 A1 | 9/2011 | Boswell | |

(56) References Cited

U.S. PATENT DOCUMENTS

| | | |
|---|---|---|
| 2011/0231383 A1* | 9/2011 | Smyth .............. G06F 17/30522 707/707 |
| 2011/0246463 A1 | 10/2011 | Carson, Jr. et al. |
| 2011/0246476 A1* | 10/2011 | Macklem .......... G06F 17/30516 707/741 |
| 2011/0246910 A1 | 10/2011 | Moxley et al. |
| 2011/0247051 A1 | 10/2011 | Bulumulla et al. |
| 2011/0258561 A1 | 10/2011 | Ladouceur et al. |
| 2011/0258679 A1 | 10/2011 | Kaplinger et al. |
| 2011/0264656 A1 | 10/2011 | Dumais et al. |
| 2011/0264737 A1 | 10/2011 | Skinner |
| 2011/0264783 A1* | 10/2011 | Cundill ............. G06F 17/30867 709/223 |
| 2011/0282941 A1 | 11/2011 | Chan et al. |
| 2011/0282944 A1 | 11/2011 | Henderson et al. |
| 2011/0282959 A1 | 11/2011 | Anderson |
| 2011/0289097 A1 | 11/2011 | Fischer |
| 2011/0314029 A1 | 12/2011 | Fischer et al. |
| 2012/0001919 A1 | 1/2012 | Lumer |
| 2012/0036200 A1 | 2/2012 | Cole et al. |
| 2012/0042218 A1 | 2/2012 | Cinarkaya et al. |
| 2012/0066618 A1 | 3/2012 | Barker et al. |
| 2012/0079004 A1 | 3/2012 | Herman |
| 2012/0079038 A1 | 3/2012 | Hersh |
| 2012/0096368 A1 | 4/2012 | McDowell |
| 2012/0101985 A1 | 4/2012 | Kemp et al. |
| 2012/0102153 A1 | 4/2012 | Kemp et al. |
| 2012/0102420 A1 | 4/2012 | Fukahori |
| 2012/0136905 A1 | 5/2012 | Pullara |
| 2012/0137224 A1* | 5/2012 | Carlsen ................. G06Q 30/06 715/738 |
| 2012/0143917 A1 | 6/2012 | Prabaker et al. |
| 2012/0150713 A1 | 6/2012 | Russel et al. |
| 2012/0158714 A1 | 6/2012 | Dumant |
| 2012/0159335 A1 | 6/2012 | Lockhart et al. |
| 2012/0173243 A1 | 7/2012 | Anand et al. |
| 2012/0191779 A1 | 7/2012 | Mandel et al. |
| 2012/0198358 A1 | 8/2012 | Carrer et al. |
| 2012/0203831 A1 | 8/2012 | Schoen et al. |
| 2012/0215707 A1 | 8/2012 | Kwong et al. |
| 2012/0216125 A1 | 8/2012 | Pierce |
| 2012/0223951 A1 | 9/2012 | Dunn et al. |
| 2012/0227073 A1 | 9/2012 | Hosein et al. |
| 2012/0233137 A1 | 9/2012 | Jakobson et al. |
| 2012/0233191 A1 | 9/2012 | Ramanujam |
| 2012/0278261 A1 | 11/2012 | Lin et al. |
| 2012/0290407 A1 | 11/2012 | Hubbard et al. |
| 2012/0331053 A1 | 12/2012 | Dunn |
| 2013/0007148 A1 | 1/2013 | Olsen |
| 2013/0018955 A1 | 1/2013 | Thaxton et al. |
| 2013/0021370 A1 | 1/2013 | Dunn et al. |
| 2013/0024454 A1 | 1/2013 | Dunn |
| 2013/0024511 A1 | 1/2013 | Dunn et al. |
| 2013/0024526 A1 | 1/2013 | Sacks et al. |
| 2013/0024788 A1 | 1/2013 | Olsen et al. |
| 2013/0041893 A1 | 2/2013 | Strike |
| 2013/0060859 A1 | 3/2013 | Olsen et al. |
| 2013/0061156 A1 | 3/2013 | Olsen et al. |
| 2013/0124636 A1 | 5/2013 | Zuckerberg et al. |
| 2013/0132864 A1 | 5/2013 | Panigrahi et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0275366 A1 | 10/2013 | Dalvi et al. |
| 2014/0130068 A1* | 5/2014 | Patterson ......... H04N 21/44222 725/5 |
| 2014/0195506 A1 | 7/2014 | Perlegos |
| 2014/0214830 A1 | 7/2014 | Fischer |
| 2014/0280267 A1 | 9/2014 | Perlegos |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0026119 A1 | 1/2015 | Fischer et al. |
| 2015/0026600 A1 | 1/2015 | Dunn et al. |
| 2015/0052074 A1 | 2/2015 | Reynolds |
| 2015/0095162 A1 | 4/2015 | Jakobson et al. |
| 2015/0134737 A1 | 5/2015 | Albrecht |
| 2015/0142596 A1 | 5/2015 | Jakobson et al. |
| 2015/0172563 A1 | 6/2015 | Jakobson et al. |
| 2015/0220587 A1 | 8/2015 | Dunn |
| 2015/0279175 A1 | 10/2015 | Hyde et al. |
| 2015/0339303 A1 | 11/2015 | Perlegos |
| 2015/0347578 A1 | 12/2015 | Tsai et al. |
| 2015/0347593 A1 | 12/2015 | Tsai et al. |
| 2016/0125083 A1 | 5/2016 | Dou et al. |

OTHER PUBLICATIONS

U.S. Appl. No. 14/338,882, filed Jul. 23, 2014, Fischer et al.

U.S. Office Action dated May 8, 2014 issued in U.S. Appl. No. 13/039,151.

U.S. Office Action dated Dec. 24, 2012 issued in U.S. Appl. No. 13/155,656.

U.S. Final Office Action dated Aug. 15, 2013 issued in U.S. Appl. No. 13/155,656.

U.S. Office Action (Advisory Action) dated Nov. 1, 2013 issued in U.S. Appl. No. 13/155,656.

U.S. Office Action dated Jan. 31, 2014 issued in U.S. Appl. No. 13/155,656.

U.S. Final Office Action dated Jun. 4, 2014 issued in U.S. Appl. No. 13/155,656.

U.S. Office Action dated Oct. 28, 2013 issued in U.S. Appl. No. 13/280,086.

U.S. Final Office Action dated Apr. 7, 2014 issued in U.S. Appl. No. 13/280,086.

U.S. Office Action dated Jul. 25, 2014 issued in U.S. Appl. No. 13/280,086.

U.S. Office Action dated Nov. 4, 2014 issued in U.S. Appl. No. 13/363,007.

U.S. Office Action dated Nov. 5, 2014 issued in U.S. Appl. No. 13/649,975.

U.S. Office Action dated Aug. 30, 2013 issued in U.S. Appl. No. 13/363,081.

U.S. Final Office Action dated Jan. 15, 2014 issued in U.S. Appl. No. 13/363,081.

U.S. Office Action dated Jun. 16, 2014 issued in U.S. Appl. No. 13/363,081.

U.S. Office Action dated Jun. 11, 2014 issued in U.S. Appl. No. 13/446,855.

U.S. Office Action dated Sep. 23, 2013 issued in U.S. Appl. No. 13/447,643.

U.S. Final Office Action dated Jan. 10, 2014 issued in U.S. Appl. No. 13/447,643.

U.S. Office Action dated May 29, 2014 issued in U.S. Appl. No. 13/447,643.

U.S. Office Action dated Mar. 27, 2013 issued in U.S. Appl. No. 13/111,183.

U.S. Notice of Allowance dated Nov. 12, 2013 issued in U.S. Appl. No. 13/111,183.

U.S. Notice of Allowance dated Jan. 2, 2014 issued in U.S. Appl. No. 13/111,183.

U.S. Office Action dated Apr. 26, 2013 issued in U.S. Appl. No. 13/112,805.

U.S. Final Office Action dated Oct. 4, 2013 issued in U.S. Appl. No. 13/112,805.

U.S. Notice of Allowance dated Apr. 21, 2014 issued in U.S. Appl. No. 13/112,805.

Chong, Frederick; Carraro, Gianpaolo; and Wolter, Roger; "Multi-Tenant Data Architecture," *Microsoft Developer Network* [database online], [retrieved on Sep. 5, 2013]. Retrieved from the Internet URL: msdn.microsoft.com/en-us/library/aa479086.aspx#mlttntda_topic6, 25 pp.

U.S. Appl. No. 14/689,981, filed Apr. 17, 2015, Dunn.

U.S. Final Office Action dated Dec. 17, 2014 issued in U.S. Appl. No. 13/039,151.

(56) References Cited

OTHER PUBLICATIONS

U.S. Office Action dated Apr. 24, 2015 issued in U.S. Appl. No. 13/039,151.
U.S. Notice of Allowance dated Feb. 9, 2015 issued in U.S. Appl. No. 13/280,086.
U.S. Office Action dated Apr. 30, 2015 issued in U.S. Appl. No. 13/280,086.
U.S. Final Office Action dated May 20, 2015 issued in U.S. Appl. No. 13/649,975.
U.S. Final Office Action dated Dec. 22, 2014 issued in U.S. Appl. No. 13/446,855.
U.S. Office Action dated Feb. 24, 2015 issued in U.S. Appl. No. 14/338,882.
U.S. Office Action dated Mar. 24, 2015 issued in U.S. Appl. No. 14/242,367.
U.S. Office Action dated Apr. 9, 2015 issued in U.S. Appl. No. 13/667,356.
U.S. Office Action dated Apr. 9, 2015 issued in U.S. Appl. No. 13/667,369.
"Stay Connected"—YooNo [retrieved from http://web.archive.org/web/20100114023540/http://yoono.com/desktop feature_connect.html, retrieved on Apr. 19, 2015] YooNO web application software, published Jan. 14, 2010, 2pp.
U.S. Appl. No. 14/615,825, filed Feb. 6, 2015, Olsen et al.
U.S. Final Office Action dated Nov. 23, 2015 issued in U.S. Appl. No. 13/039,151.
U.S. Office Action dated Sep. 24, 2015 issued in U.S. Appl. No. 13/155,656.
U.S. Notice of Allowance dated Sep. 29, 2015 issued in U.S. Appl. No. 13/280,086.
U.S. Office Action dated Nov. 6, 2015 issued in U.S. Appl. No. 13/649,975.
U.S. Office Action dated Jul. 17, 2015 issued in U.S. Appl. No. 13/446,855.
U.S. Final Office Action dated Sep. 22, 2015 issued in U.S. Appl. No. 14/242,367.
U.S. Office Action dated Jan. 15, 2016 issued in U.S. Appl. No. 14/242,367.
U.S. Final Office Action dated Dec. 2, 2015 issued in U.S. Appl. No. 13/667,356.
U.S. Final Office Action dated Dec. 3, 2015 issued in U.S. Appl. No. 13/667,369.
U.S. Office Action dated Mar. 24, 2016 issued in U.S. Appl. No. 13/039,151.
U.S. Notice of Allowance dated May 18, 2016 issued in U.S. Appl. No. 13/155,656.
U.S. Notice of Allowance dated Jun. 6, 2016 issued in U.S. Appl. No. 13/649,975.
U.S. Final Office Action dated Apr. 19, 2016 issued in U.S. Appl. No. 13/446,855.
U.S. Office Action dated Sep. 1, 2016 issued in U.S. Appl. No. 13/667,356.
U.S. Office Action dated Jun. 30, 2016 issued in U.S. Appl. No. 13/667,369.
Chandrasekar, Giridhar (2004) "Design and Implementation of Easily Maintained Online Community," *School of Computing, U. Leeds* (Dissertation in support of MSc in Distributed Multimedia Systems) [retrieved from https://vlebb.leeds.ac.uk/bbcswebdav/orgs/SCH_Computing/MSCProj/reports/0304/chandrasekar.pdf], 84 pages.
U.S. Final Office Action dated Sep. 26, 2016 issued in U.S. Appl. No. 13/039,151.
U.S. Office Action dated Nov. 14, 2016 issued in U.S. Appl. No. 14/689,981.
U.S. Notice of Allowance dated Mar. 3, 2017 issued in U.S. Appl. No. 14/689,981.
U.S. Final Office Action dated Sep. 14, 2016 issued in U.S. Appl. No. 14/242,367.
U.S. Final Office Action dated Apr. 28, 2017 issued in U.S. Appl. No. 13/667,356.
U.S. Final Office Action dated Feb. 10, 2017 issued in U.S. Appl. No. 13/667,369.

\* cited by examiner

METHODS AND SYSTEMS FOR PROVIDING ENHANCEMENTS TO A BUSINESS NETWORKING FEED

The present application claims benefit of priority under 35 USC 119(e) of U.S. Provisional Application No. 61/360,855, entitled "METHODS AND SYSTEMS FOR PROVIDING ENHANCEMENTS TO A BUSINESS NETWORKING FEED," filed on Jul. 1, 2010.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCES TO RELATED APPLICATIONS

This application is related to the commonly owned, co-pending U.S. non-provisional patent application Ser. No. 12/945,410, entitled "SYSTEMS AND METHODS FOR IMPLEMENTING ENTERPRISE LEVEL SOCIAL AND BUSINESS INFORMATION NETWORKING," by Lee, filed Nov. 12, 2010, which is incorporated by reference herein in its entirety.

BACKGROUND

The present invention relates generally to database systems, and more particularly to providing improved visibility to feeds associated with records in an on-demand enterprise services environment.

Running a company typically requires maintaining data related to the company's business, such as sales numbers, customers, business opportunities, and other information pertinent to sales, revenue, networking This data is stored on a database that is accessible to various individuals belonging to that company. Often, it is more effective for the company to have a third party maintain a database containing the data, as opposed to the company maintaining the database itself. Accordingly, in some cases, the database can be a multi-tenant database which maintains data for multiple companies.

Providing both social and business networking within and between these companies offers an invaluable tool in the current technology based infrastructure. Not only can the networking facilitate communication between individuals, but it can also facilitate communications between groups of individuals, both within a single company and between several different companies. With the abundance of information provided from each company, a user cannot effectively and efficiently search and view the pertinent information available across a network. This is not only due to the amount of information stored on the system, but also to the amount of information being added to the system by each user at any given time. Though a user may review specific data on a particular day, that data may change by the next day, or even within the hour. Additionally, new information may be added to the system which is not known to a user. Accordingly, the company may wish to provide efficient and easy access of information, such as the ongoing conversations regarding a specific account or business opportunity, to its employees and to other users of the database without those employees having to navigate the entire database in a time consuming manner. Since each user may have interest in a specific area of the company, it is also important for that user to be able to easily access all relevant information and other users involved in that area.

Therefore it is desirable to provide systems and methods that overcome the above and other problems relating to the accessibility of data on a database systems, such as the searching of publicly available data, the viewing of that data and the connecting of users on an external server, such as a multi-tenant database.

SUMMARY

Embodiments of the present invention can provide systems, methods, and apparatus for organizing feeds through creation of lists which contain the feed items from records within the list. Additionally, embodiments of the present invention can provide systems, methods and apparatus for searching the aforementioned lists, feeds, connections between users, messages, objects, feed elements, and other data related to a multi-tenant on-demand database system.

In one embodiment and by way of example, a method of providing a feed containing feed items associated with records stored in a database system is provided. The method includes initiating a creation of a list to be stored on the database system and receiving a selection of a plurality of records. Each record associated with a respective record feed that is capable of containing one or more feed items. The method further includes associating the selected records with the list and one or more users of the database system are capable of subscribing to the list. The method further includes generating a feed containing feed items of the record feeds of the records associated with the list. The feed is provided for a subscriber of the list.

In another embodiment and by way of example, a method for browsing a plurality of lists associated with records stored on a database system is provided. The method includes receiving one or more criteria for searching a plurality of lists, searching the plurality of lists based on the criteria to identify lists matching the criteria, and generating a set of lists that include the data matching the criteria. In one embodiment, each list is associated with a plurality of records stored on the database system and each record is associated with a respective record feed that is capable of containing one or more feed items. In another embodiment, each list includes at least one field capable of storing data for comparing to the criteria.

In another embodiment and by way of example, a method and system is provided for searching a plurality of object types, e.g. Accounts, Opportunities, Cases, etc. and all users on the on demand database system are searchable. The method is performed by entering one or more search criteria, comparing fields of records associated with the plurality of object types based on the search criteria and displaying a list of objects which have fields matching the search criteria on a user interface. In some embodiments, the search criteria can include search terms, such as a name, a number of subscriptions and object type. In other embodiments, the displayed list of objects includes additional information associated with each object, such as a date and a time of a most recent modification to a record feed associated with that object or a number of subscriptions for that object.

In another embodiment and by way of example, a method is provided for customizing a display of records associated with a user on an on-demand database system. The method includes selecting a user profile object, analyzing the selected user profile object based on subscription criteria and displaying one or more predefined analytics of the user profile. In some embodiments, the one or more predefined analytics include graphical representations of the analytics.

In yet another embodiment and by way of example, a method and system is provided that allow a user to modify a plurality of subscriptions in a single instance. The method includes filtering a plurality of objects on a database system based on a criteria, selecting the plurality of objects matching the criteria and modifying a subscription to the selected plurality of objects.

Other embodiments are directed to systems and computer readable media associated with methods described herein.

While the present invention is described with reference to an embodiment in which techniques for performing searches of feeds in an on-demand enterprise services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2®, by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Figure 1:
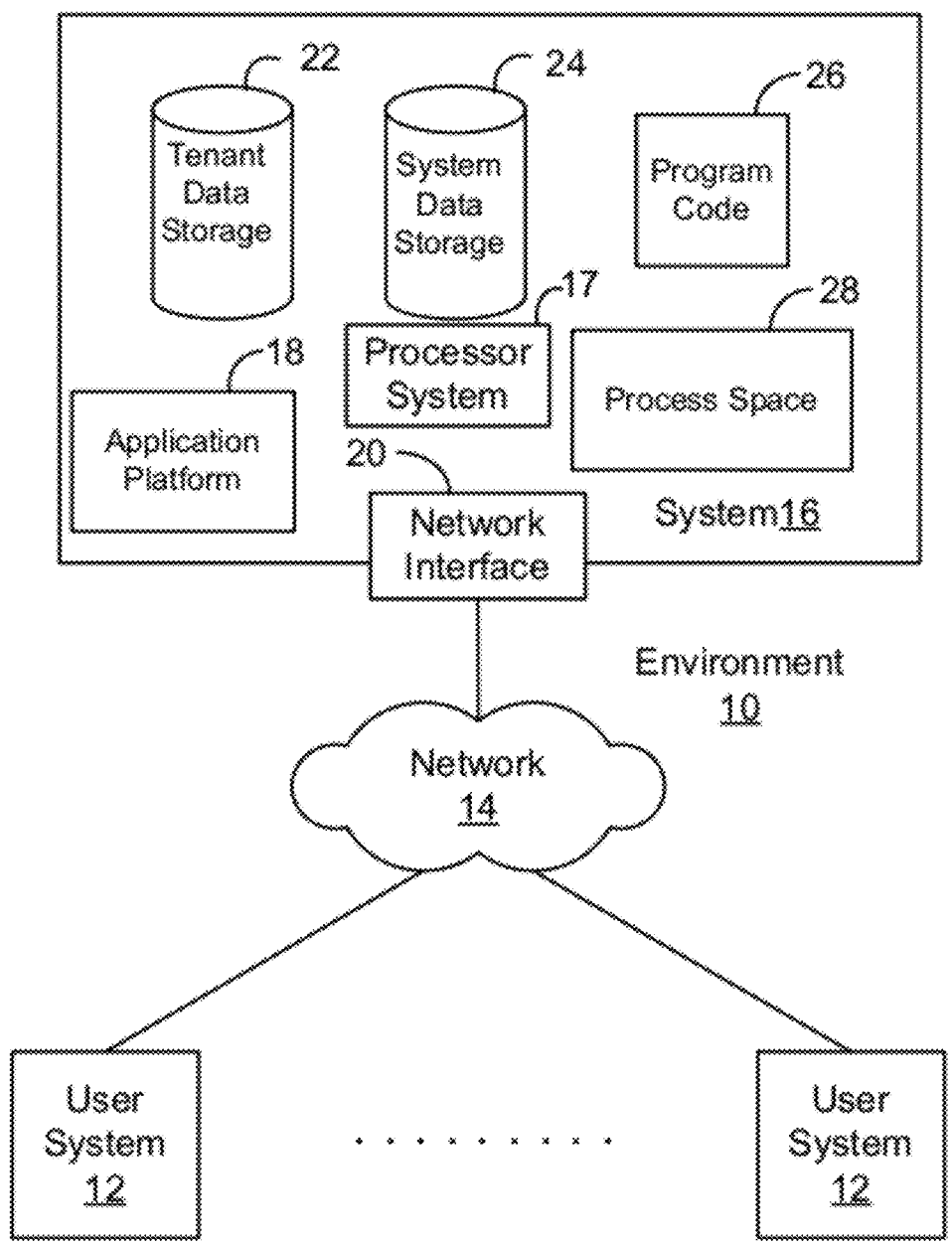
FIG. 1 illustrates a block diagram of an example of an environment wherein an on-demand database service might be used.

Embodiments of the present invention can facilitate user networking across the database with both other users and with data stored in object records on that database. These applications can each allow for users to have increased visibility to data on the system, e.g., through feeds associated with objects on the database system. In addition, the users can have the ability to selectively access and view targeted records of objects on the system.

In one embodiment providing a List application, a user can create targeted lists related to a selection of objects on the database system. Each list can include a related feed for that list, which includes the feed items from each associated object feed. Accordingly, the user is provided with the ability to view a compilation of data relating to a specific group of objects in a single window of the user interface. These lists can include entity feeds of records, such as Accounts, Opportunities, Leads, etc., child records associated with those records, and profile feeds of instances of user profiles on the database system.

Any user on the database system can then search for a list having feed items relating to a certain subject, e.g., through a word search, and/or including specific objects on the database system. Accordingly, users having similar interests in objects on the system are not required to create new lists for each area of targeted interest. In one aspect, any user having visibility to a list found in a search can then follow the list. Each user who follows that list can then receive updates in his/her user profile feed regarding that list feed.

In further embodiments, a Directory application is provided to the users on the database system which allows users to easily find and connect to other users by filtering users on the system by various criteria. A Dashboard application displays graphical analytics relating to a particular user and allows a user to view his/her relationships with other users on the database. Furthermore, a Search application allows users to search database objects based on object type and on entered terms utilized to search the fields of records associated with those objects. A Connector application allows user to find other users based on, for example, user interests, user positions within a company(e.g., title), the company associated with that user, etc. Finally, a My Groups application allows a user to easily access and search groups to which that user subscribes. Each of the aforementioned embodiments improves data sharing on the system by allowing users to customize how that data is both accessed and viewed by the user.

Next, mechanisms and methods for providing systems and methods for implementing enterprise level social and business information networking capable of supporting the aforementioned applications will be described with reference to example embodiments.

I. General Overview

Systems and methods are provided for systems and methods for implementing a feed for enterprise level social and business information networking on a multi-tenant database system.

As used herein, the term multi-tenant database system refers to those systems in which various elements of hardware and software of the database system may be shared by one or more customers. Enterprise level social and business information networking can allow for the multi-tenant database system users to subscribe to or "follow" other users in the system along with other "feeds" related to specific database entries. Following a user provides access to real-time updates about other users and the data entries (e.g., messages, updates, stories, etc.) added to followed feeds within the multi-tenant database system. A user can have multiple subscribers, and multiple subscribers can also belong to groups. Each group may be related to an object on the database, such as an Opportunity page of a tenant, and each user can be an object on the database. Records of the data added to each feed associated with an object can be stored as tables on the database. The records can include fields, which determine how the data is to be stored and displayed in a feed as well as maintain a list of the subscribers to that feed, along with any additional information and/or rules defined for that feed.

An example of the aforementioned type of enterprise level networking is referred to herein as Chatter®. Chatter® is a social networking service provided by salesforce.com, inc., that, in an embodiment, facilitates networking between users of tenants in a multi-tenant database. In some situations, the shared information (e.g., a feed) between users is not readily viewable, dependent on the record feed being currently displayed to a user. Accordingly, providing a way in which a user can customize a view of the shared information which is of interest to that user, rather than navigate each object related feed of interest allows a user greater flexibility across the database system. This flexibility can provide additional access to content in the system which can not only increase business opportunities but greater networking possibilities and more efficient use of the database system. In order to provide this added user flexibility of navigating feeds across a database system, methods (e.g., as implemented in Chatter List applications) can be implemented to selectively combine specific record feeds as well as profile feeds into a list which has an associated feed. These lists can be accessible by a plurality of users across the database system and can be browseable by users in the database system based on specified search criteria.

An overview of a multi-tenant database system customizable for feeds will be described in the following sections, followed by the mechanisms and methods for implementing certain applications ((e.g., lists) for a user to customize his/her interaction with the database system. The following description of providing customizable aspects of the database system is made with reference to example embodiments.

II. System Overview

FIG.1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities and the capacity of a particular user system 12 might be entirely determined by permissions (permission levels) for the current user. For example, where a salesperson is using a particular user system 12 to interact with system 16, the user system 12 has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared, such as will be described in the case of feeds (i.e., a feature of "Chatter®"). In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
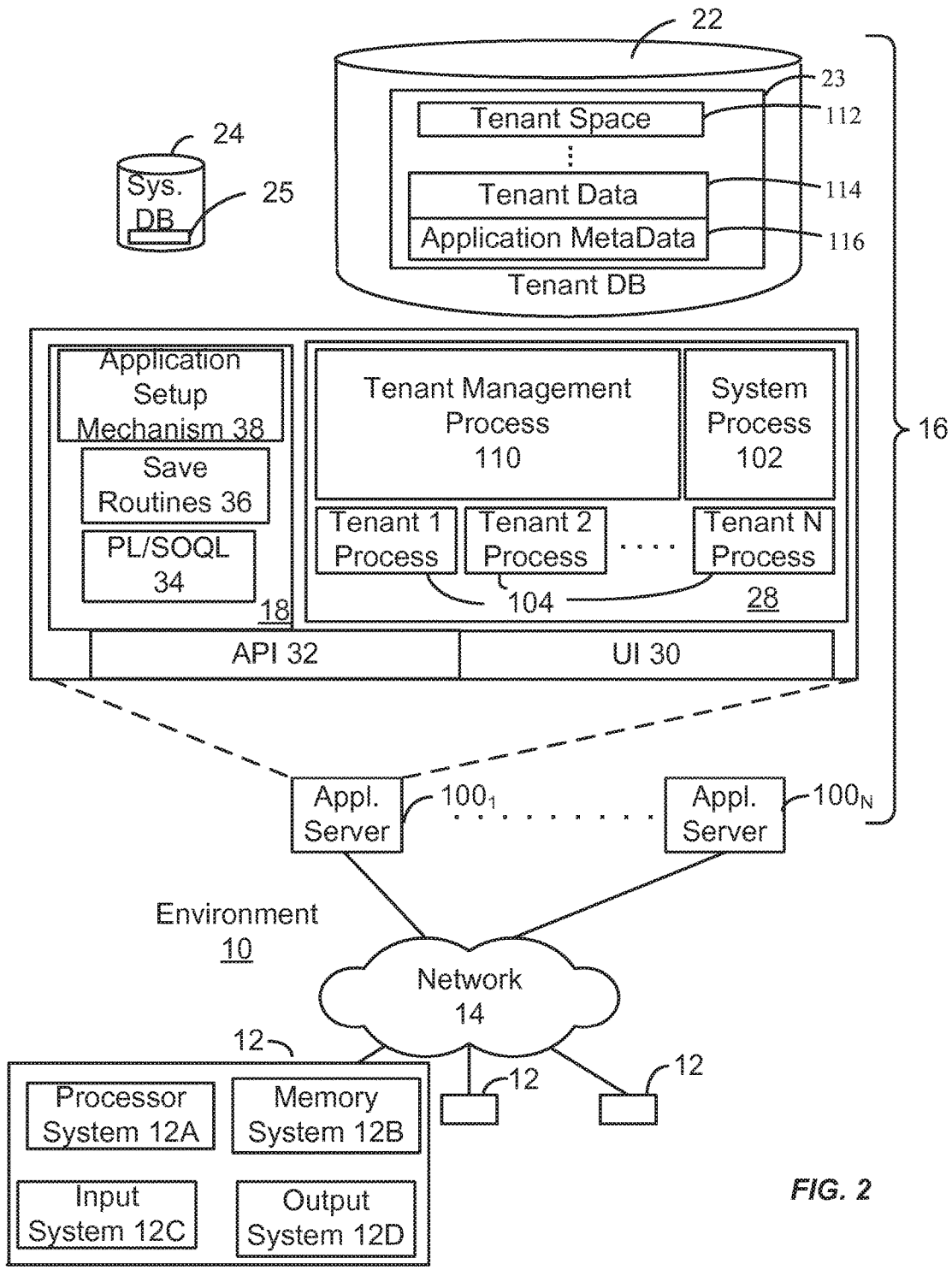
FIG. 2 illustrates a block diagram of an embodiment of elements of FIG. 1 and various possible interconnections between these elements.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Pat. No. 7,730,478 entitled, "METHOD AND SYSTEM FOR ALLOWING ACCESS TO DEVELOPED APPLICATIONS VIA A MULTI-TENANT ON-DEMAND DATABASE SERVICE," by Craig Weissman, filed Sep. 21, 2007, which is incorporated in its entirety herein for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5

Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

Figure 3:
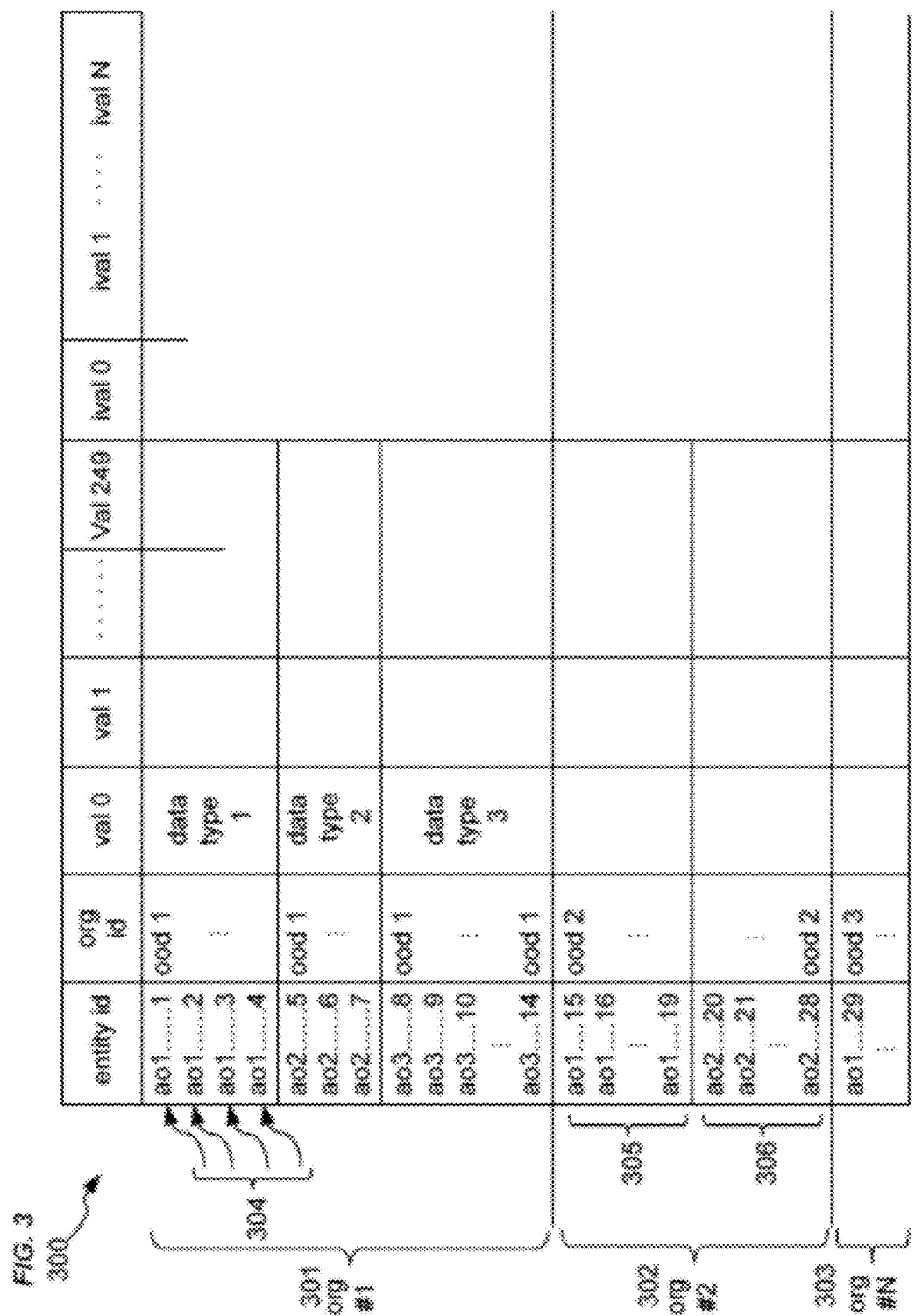
FIG. 3 illustrates an exemplary table of tenants and related entities stored in an on-demand database system.

In some multi-tenant database systems, tenants may be allowed to create and store custom objects, or they may be allowed to customize standard entities or objects, for example by creating custom fields for standard objects, including custom index fields. U.S. Pat. application Ser. No. 10/817,161, filed Apr. 2, 2004, entitled "CUSTOM ENTITIES AND FIELDS IN A MULTI-TENANT DATABASE SYSTEM", and which is hereby incorporated herein by reference, teaches systems and methods for creating custom objects as well as customizing standard objects in a multi-tenant database system. In certain embodiments illustrated in FIG. 3, for example, all custom entity data rows 304, are stored in a single multi-tenant physical table 300, which may contain multiple logical tables 305, 306, per organization. It is transparent to customers 301, 302, 303, that their multiple "tables" (e.g., 305, 306) are in fact stored in one large table or that their data may be stored in the same table as the data of other customers.

Theses customers, or tenants, may also be able to share these entities or objects or selective information relating to those entities with other customers subscribing to the database as well as between users having access to that customer's entities. The aforementioned shared information, which also can be referred to as Chatter® by salesforce.com, inc., facilitates social and business networking between users of the tenants in the multi-tenant database. If a customer provides public access rights to view a particular entity (i.e., object), any number of users can subscribe to that entity. Accordingly, if any form of Chatter® (e.g., data in a feed) is added to a feed of that entity, modifications and/or additions are made to the information stored in the record (e.g., a table) for that entity, and a story, message, post or other data shared in the feed is made viewable to the subscriber(s). However, if a user views the entity without being a subscriber, the user may or may not be able to the view any of the data, or may be able to view only one or more elements provided in the feed associated with that entity. These viewing rights are dependent on the privacy settings can be imposed not only by the user that provided the data (e.g., message, comment) to the feed, but also the settings associated with the entity of the feed.

When a user has viewing rights to a feed and the user subscribes to a feed of a record, the feed items from that record feed are provided within the user profile feed. Due to the amount of feed items involved with a user subscribing to numerous feeds on a database system as well as the amount of new feed items being added to the database system at any given time, the user may wish to customize the view of his/her feed based on certain criteria as well as browse feed across the database based on criteria. This allows the user to view relevant content as that content is made available on the system, without having to access each object and/or user profile feed. Accordingly, additional functions which facilitate user visibility of that information allows users to create customized feeds (e.g., Lists) as well as browse those customized feeds.

The following detailed description will explain the aforementioned combination and subsequent searches performed on feed record of objects within the database. The detailed description will first provide an overview of Chatter® and the definitions of the terms for elements relating to the networking which implements Chatter®. The following sections then describe methods of creating, editing and searching lists in Chatter® (e.g., a feed elements) enabled objects in accordance with aspects and embodiments. Further, a section providing additional embodiments of Chatter related applications is provided. Exemplary embodiments are provided which allow users on the multi-tenant database system to search Chatter, view user connections within Chatter and view metrics related to user updates in Chatter and perform additional functions one Chatter enabled records. The techniques that can be utilized to implement the aforementioned methods are also described.

III. Chatter®

Chatter® is a term used to describe social and business networking between users of tenants in a multi-tenant database. This networking can be implemented by tracking updates made on the database, such as modifications of data in a record (e.g., stories), or data posted to a feed (e.g., comments, posts, messages) by a user. Embodiments related to Chatter® are further described in commonly owned U.S. patent application Ser. No. 12/945,410, filed Nov. 12, 2010, entitled "Enterprise Level Business Information Networking for Changes in a Database," which is incorporated by reference.

Feeds can be considered as a stream of feed items about what is occurring in the database system. In one aspect, the feeds are a way to stay up-to-date, as well as an opportunity to reach out to co-workers/partners and engage them around common goals. Feed items can include stories, messages, comments and posts.

Stories describe events that happen to a record. In one embodiment, the stories are automatically generated and are conveyed in complete sentences, and thus can be easily understood as they are in "plain English." In various embodiments, stories can be generic containers with formatting restrictions, can be published to multiple feeds, can be deleted by the author (which deletes story from all feeds), can include multiple change events in one story (john changed the account status and amount . . . ), and respects sharing and field-level security (FLS).

Feeds can show up across an application associated with the database. Feeds can be scoped to the context of the page on which they are being displayed. For example, how a story is presented can vary depending on which page it is being displayed (e.g. in news feeds, discussed below). In one embodiment, a feed can contain a finite number of stories (e.g. 50).

Events are activities in the system that can trigger a story. For example, an event can be whenever data is saved to a record or to one of its related records, or the creation/deletion of a record. The events that trigger a story for a record can be restricted to changes for only certain fields of the record, which can differ depending on which user is receiving the feed. Likewise, in an embodiment, a record can include a field indicating that specific events in an Events History Table are private, which automatically encrypts stories triggered by those events.

Entity Feeds are feeds on an entity record (like Account, Opportunity, Case, Contact). For example, an entity feed can tell a user about the actions that people have taken on that particular record or on one its related records. The entity feed can include who made the action, which field was changed, and the old and new values. In one embodiment, a user can access an entity feed by viewing the record, and the feed can be displayed on a home page (detail page) of the entity. Stories of an entity feed can also be posted (published) via a news feed. In one embodiment, entity feeds can exist on all supported object detail records as a related list.

Figure 4:
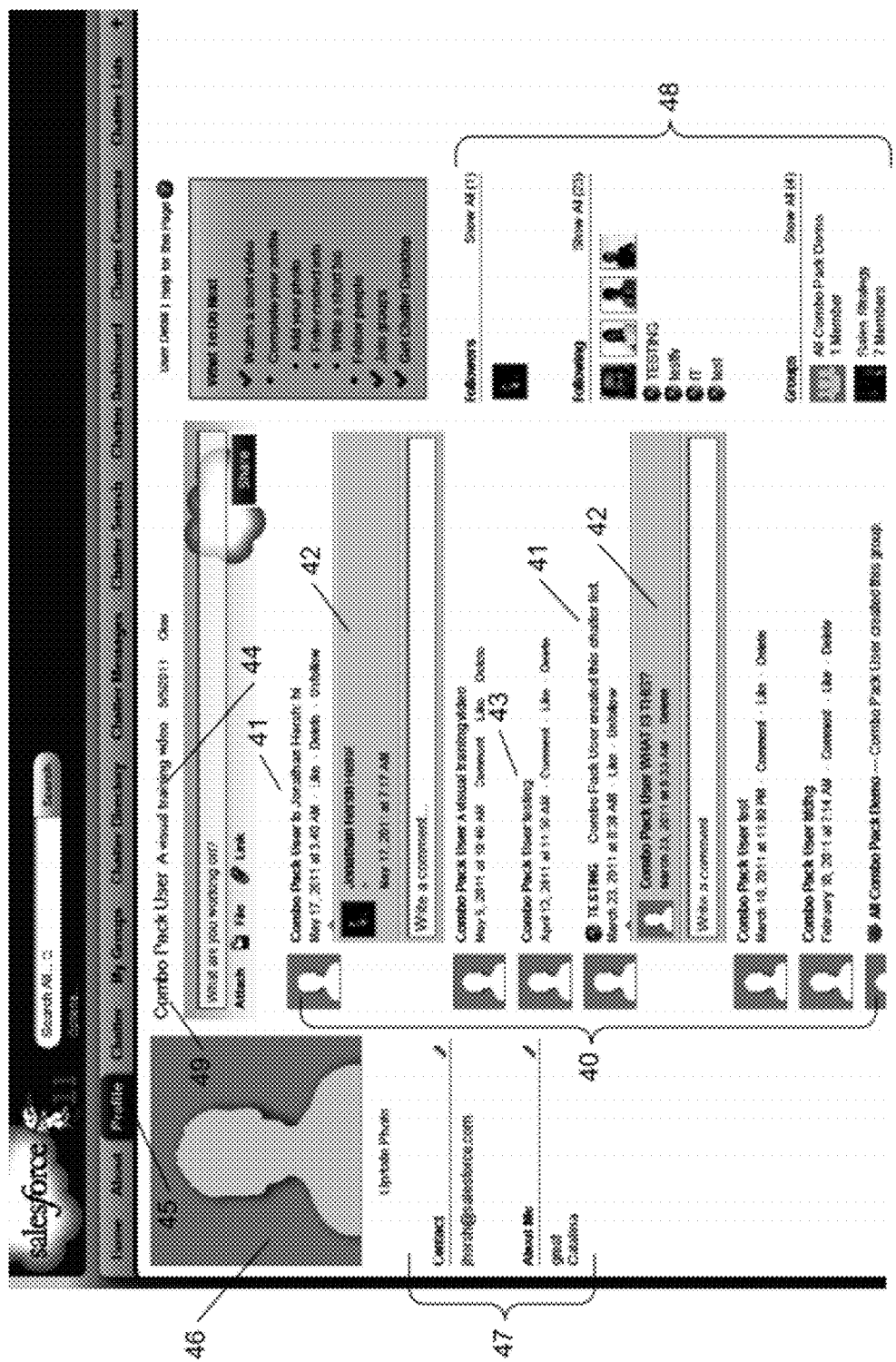
FIG. 4 illustrates an exemplary screenshot of a user profile in an on-demand database system.

An embodiment is described with reference to FIGS. 4-5. As shown in FIG. 4, the profile 45 of a particular user is selected. This may be shown to the user who is logged in to his/her account. The user profile has a profile feed 40. Profile feed exist for user profiles and can tell a first user about all the actions that a person (whose profile feed is being viewed) has taken across all the objects that are visible to the first user. A profile feed can be provided on a user's profile page, which can be selected through a tab 45 in the user interface. A user profile can be a type of object stored on the database system (e.g., user object). For example, a user object can include fields such as a user name 49, a user photo 46, user contact and related information 47, be linked with other information, such as the user's profile feed 40 (which may be stored, for example, as a field, child object, or related object), and other information 48 regarding user networking across the database system. For example, if a user record stores activities of the user, the profile feed 40 can provide stories 41 about updates to the user record. For example, if a user changes his/her position within a company and modifies this field in a record associated with the user profile, a story can be generated by the system and posted into the user profile feed which says, "user change his/her position from X to Y." Additionally, the profile feed 40 can include status posts 43 given by the user and comments 42 on items in the user's profile feed.

Referring again to FIG. 4, in one embodiment, profile feed 40 contains feed items 41 about the last 50 actions (or some other amount) this user took that created an event. A profile feed 40 can also include shared information from one user to the person whose profile feed is being viewed in the form of a post, comment or message, all which are explained in further detail in the following paragraphs. In another embodiment, a profile feed can include only the last 50 data entries to the feed.

Figure 5:
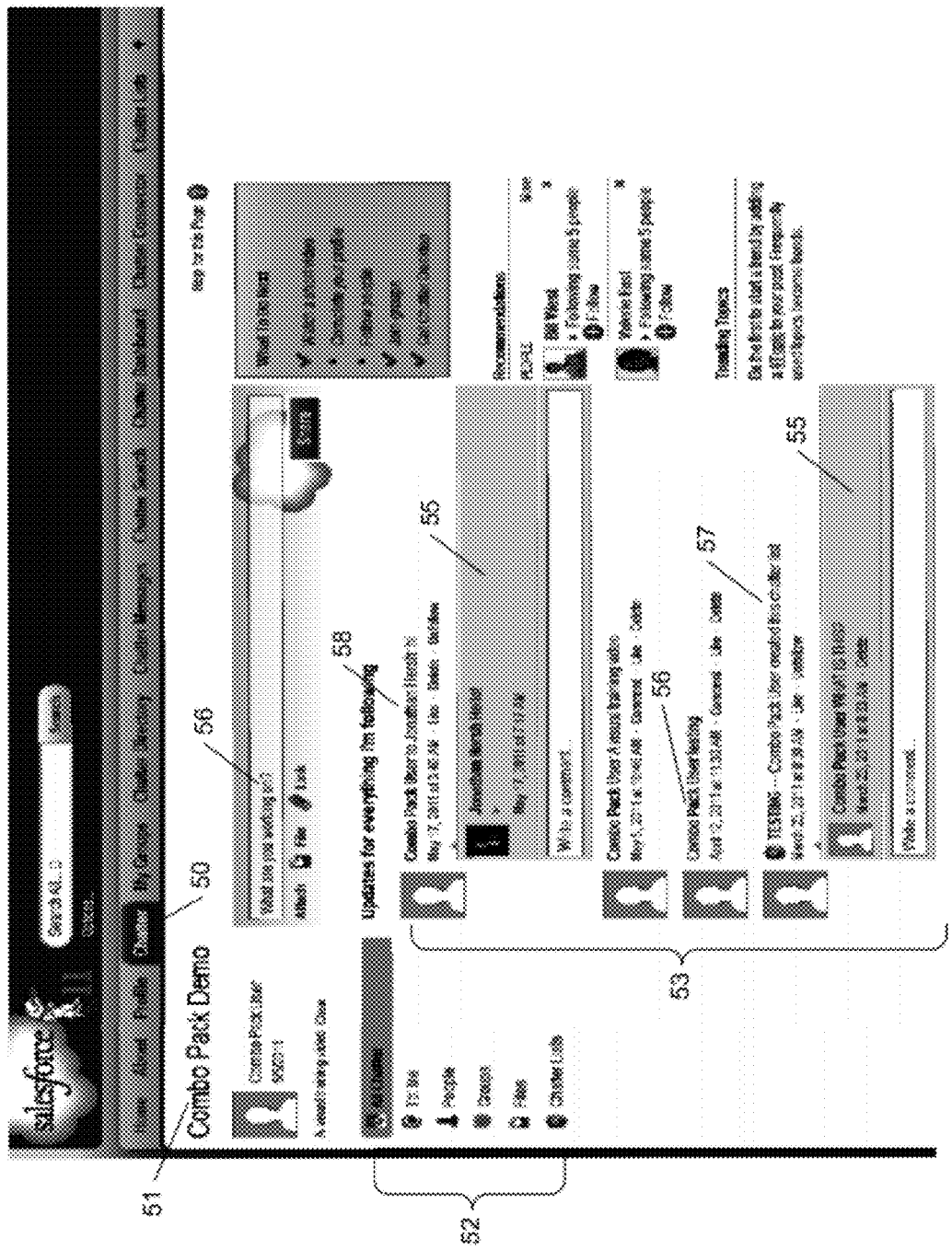
FIG. 5 illustrates an exemplary screenshot of a Chatter® application in an on-demand database system in one embodiment.

FIG. 5 provides a screenshot of the Chatter® application in the on-demand database system in one embodiment. A news feed is an aggregated feed of all the entity feeds to which a user subscribes. The news feed 53, which may also be referred to generally as a feed, can be provided on the home page of the subscribing user or, as shown in FIG. 5, the Chatter® page of the user. Thus, a news feed can be created by and exist for a particular user. As shown in FIG. 5, for example, a user 51 can subscribe to receive entity feeds of certain records that are of interest to the user, and to receive profile feeds of people that are of interest (e.g. people on a same team, that work for the user, are a boss of the user, etc.). A news feed 53 can tell a user about all the actions across all the records (and people) you've explicitly (or implicitly) subscribed to via the Subscriptions Center (described below). In one embodiment, only one instance of each feed item is shown on a user's news feed 53, even if the feed item is published in multiple entities to which the users is subscribed. In one aspect, there may be delays in publishing news articles. For example, the delay may be due to queued up messages for asynchronous entity history persistence. Different feeds may have different delays (e.g. delay for new feeds, but none of profile and entity feeds). In another embodiment, certain stories regarding a subscribed profile feed or an entity feed are not shown because the user is not allowed, e.g. due to sharing rules (which restrict which users can see which data).

In one embodiment, a group feed can be setup, where a group of users receive the same data posted to the feed. In various embodiments, the group can be created based on certain criteria that are common to the users, can be created by inviting users, or can be created receiving requests to join from a user. A user can be part of multiple groups and can have access to view these groups through selection of My Groups in the user interface. My Groups is further described with reference to FIG. 18 in the section labeled "Other Embodiments."

In other embodiments, a single user can create a list of objects that have associated feeds. The creation of the list can produce a dynamic population of the list's feed, which includes a combination of the feeds associated with the objects in the list. Lists are further described in the following section named "Chatter® Lists."

Also, in some embodiments, the record that has been updated, which includes creation of the record, can be provided in the feed (e.g. as a flash rendition of the document) to show which users are part of the group. This can be accomplished by altering the settings of the group feed. For instance, when a field changes in the record, or a new field is added, a column (or row), which includes the users of the group in the record of the group feed, is copied into the feed.

In one embodiment, sharing rules and FLS are applied when the feed is being displayed. In another embodiment, profile feeds can be updated immediately after action is taken, such as when a message or comment is posted to the feed.

A user can subscribe to multiple object feeds and user profile feeds. When a user subscribes to an object, the user is following that object. Similarly, other users can subscribe to a particular user without that user subscribing to them. For example, user X can subscribe to (e.g., "following") user Y, but user Y does not subscribe to (e.g., "not following") user X.

In some embodiments, a subscription center acts as a centralized place in the application associated with the database (e.g. application platform 18) to manage which records a user subscribes to, and which field updates the user wants to see on those stories. The Subscription Center can use a subscription table to keep track of the subscriptions of various users. In one embodiment, the subscription center shows a listing of all the items to which a user is subscribed. A user can unsubscribe to subscribed objects from the subscription center. In an embodiment, when stories are created dynamically, access rule checks are not done upon subscription or unsubscription. In another embodiment, access rule checks are done upon subscription or unsubscription. For instance, the privacy rules of an object are imposed upon subscription to an object and keys are automatically generated and stored between the object and the subscriber upon subscription. The sharing of keys for access to shared information in a feed is detailed further in the commonly owned U.S. patent application Ser. No. 13,089, 726, entitled "Methods and Systems for Providing a Secure Online Feed in a Multi-Tenant Database Environment," by Slater, filed Apr. 19, 2011 which is hereby incorporated by reference in its entirety.

In one embodiment, a user may be required to have read access on an entity to create a subscription to it. For example, a user cannot subscribe to a private object to which public access is not available. This can minimize (but not eliminate) the case where a user is subscribed to entities they cannot access which slows down news feed queries.

In one embodiment, there is an Auto Subscription feature. This automatic subscription can ensure that a user is receiving certain feeds. Auto subscription can happen upon: 1.) New entity creation: the owner (not necessarily the user who created the entity) is subscribed; 2.) Ownership change: the new owner should become auto subscribed; and 3.) Lead convert: the user doing lead convert should be auto subscribed to the new account, opportunity and contact. Auto subscription can be controlled by per user preference. The user-preference can be a negative preference so that the default is to auto-subscribe.

Referring again to FIG. 5, Comments 55 can be added to (hang off) any story 57 and a user can reply to other comments on the same story. In one embodiment, story comments do not trigger other stories. In another embodiment, comments stay with the story. Accordingly, if a comment is made in the News Feed 53, it propagates to the appropriate Entity Feed as well. If a story is deleted, its corresponding comments are deleted as well. Comments 55 can also be filtered. For example, a tab can exist to see all comments made by the user and its corresponding stories. In yet another embodiment, new comments do not update the story timestamp. Also, the story can be continued to show if it has had a comment within the last week.

In some embodiments, most stories can be commented on. In other embodiments, Ideas Stories, Collaboration Stories, and Case Stories are not commentable. In one embodiment, if a user in whose profile feed the story is located or the user who causes the generation of the story to occur marks the story as "private," the story cannot be commented on. In a further embodiment, if the story is marked private prior to generation, the story may not appear in any feed. In further embodiments, only a user who has access to a story, i.e., caused the generation of the story, can comment on the story.

Wall Posts 58 are comments on a profile page or an entity page, as opposed to a comment on a specific story or other feed items. Wall posts are 58 another form of a story, which is not triggered by a change to the record in the system, but an addition to the record on a profile page or entity page made by a user having access to those pages. In one embodiment, the wall posts 58 can last forever. In some embodiments, wall posts 58 can be appended to other wall posts, similar to comments on stories, as described above. As will be described in further detail in the following sections, these wall posts, which may also be referred to as messages, feed data or, generally, as posts, can be selectively visible to users on the database system. The user entering the message into a feed can pre-select the sharing rules for messages originating from that user, such as in other's profile pages, entity pages or to groups. Alternatively, the user can select which other users or groups of users will have access to view the message once it is entered. In some embodiments, the user whose profile feed into which the message is posted can also impose sharing rules on the message.

As shown in FIG. 5, Status Posts 56 are short (e.g. SMS-sized) messages posted by users that can answer a specific question, which can be posted as a comment 55 or wall post 58. Status posts can appear both in the news feed 53 of a user's Chatter® page 50, as well proximate to the user's identifying information (e.g., user name 57, photo, etc.). In one embodiment, status posts 56 also can last forever. In an embodiment, users can rate the different status posts so that a best answer can be identified.

In some embodiments, stories, comments, and posts can be provided on feeds associated with users of different tenants or within the originating tenant, as well as objects in different tenants or within the originating tenant. Sharing rules can ensure that users do not see data within a feed that they are not permitted to see as selected by the user adding that data to a feed or administrator of an object which accepts feed data from a plurality of users on the multi-tenant database system. For instance, if a tenant allows a particular object (e.g., user profile, opportunity, etc.) to be "public", other tenants may readily view the data posted in the feed associated with that object. Alternatively, only feed data associated with specific fields of that object may be viewable, or only data (e.g., posts, messages, comments) left "public" by the subscribers to the object feed may be viewable by all the subscribers or users having viewing access to that feed. In some embodiments, only the subscribers to that object feed may view the data in the feed. These sharing rules, along with how the shared data is protected both between users and tenants, are further explained in the following sections.

A Feed Generator can generate the top stories (e.g., 50) and story comments that show up on Entities, Profiles and news Feeds. The feed generator can de-dupe events (i.e. prevent duplicates) that are generated from numerous objects. For example, since a story can be published to multiple feeds (e.g. John Choe changed the Starbucks Account Status) and a person can be subscribed to both the Starbucks account and John Choe, embodiments can filter out duplicates before displaying the items in a news feed. Thus, the Feed Generator can collapse events with multiple records for a single transaction into a single story and ensures the right number of stories for the particular feed.

In one embodiment, feeds are generated by the feed generator by querying the appropriate subset of: The Feeds Entity History, Status posts, Wall posts and associated story comments. What gets recorded in the Entity history table, as well as what is displayed, is controlled by the Feed Settings page in setup, which is configurable by an administrator and is the same for the entire organization. The Feed Generator can also check to make sure that no one sees data that they don't have access to see (e.g. according to sharing rules queried in the Feed Entity table). In one embodiment, in the news feed, the Feed Generator looks at a person's subscription center to decide which feeds to query and returns a de-duped list of stories for the user.

There can be various feed settings for the generation of different feeds. For profile feeds and entity feeds, stories can be written for all standard and custom fields on the supported objects. Feed settings can limit how many and which fields are being tracked per object. In one embodiment, there is a separate limit for number (e.g. 20) of trackable fields for entity history changes shown in the feed. A separate UI can exist to capture those changes. In another embodiment, default values may be picked for the field preferences table and eventually expose it in a "Subscriptions Center."

In some embodiments, feed queries only return changes in records for entities for which the user has access. In one aspect, an individual field change may not be visible if the user does not have FLS access to the field of a particular object.

Regarding viewing privileges of feed, in one embodiment, a user can always see all of his own subscriptions (even if he's lost read access to the parent record). For access to other user's and entity's subscriptions, a user can be required to need read-access on the parent-id to see the subscription. Having visible access to the subscriptions can be determined in the initial set-up of the feed associated with a user and/or entity.

Regarding create and delete privileges, in one embodiment, users with having the ability to modify all data, e.g., administrator rights, can create and delete any subscriptions to an object. For example, if a user is an administrator of an entity, or has all access rights to that entity, the user may be able to delete one or more subscribers in the plurality of users subscribing to that entity. However, other users in the plurality of users subscribing to that entity may only be able to discontinue their own subscription to that entity. In another embodiment, a user can create and delete subscriptions only for his/herself.

Once a subscription to an entity or other user is discontinued (e.g., deleted), sharing rules for viewable access to data within the entity's feed are also discontinued, or imposed, dependent on how the rules are defined for that particular feed. However, any sharing rules defined by the user whose subscription to the feed has been deleted, are automatically discontinued as well.

Supported Events include actions for standard fields, custom fields, and standard related lists. Regarding standard fields, for the entity feed and the profile feed, a standard field update can trigger a story to be published to that feed. In one embodiment, which standard field can create a story visible in the entity feed can be set by an administrator of the entity. In another embodiment, a user can set which standard fields create a story for that user's feed if they are subscribing to that entity and associated fields, and if the administrator has granted public access rights to those fields. Custom fields can be treated the same or differently than standard fields. User's profile feeds can be treated as custom objects having custom fields defined by the user, or defined by the administrator of the tenant so that specific events triggering stories within a feed can be made visible to only a limited amount of users.

Chatter®-enabled fields associated with a user profile, as well as Chatter®-enabled fields pre-defined for objects and custom objects on the database can be searchable based on the field name, type and/or information contained within those fields. In some embodiments, all fields are searchable, regardless whether they are enabled for chatter feed tracking This enables users of the database system to view any relevant information on the database to a directed word and/or phrase search of the publicly available Chatter®-enabled records on the database. Searching of records within the database aids in allowing users to access useful networking information without having to select a specific object's feed and review all items contained within that feed. Searching of Chatter®-enabled records is further described in the following section labeled "Chatter Search."

In other embodiments, if a user wants to see a feed of the related list item, then the user can subscribe to it. For example, a user may find a specific opportunity related to a specific account to be of interest. Thus, if a user cares about that object, they can always browse to that object's feed, or subscribe to that object in their news feed. In some embodiments, depending on the sharing rules imposed by the owner of an object, the feed of the related list item may or may not be viewable by the user subscribing to that item and/or the feed of the parent object may not be viewable to the user. In one embodiment, all related Objects are tracked separately from the entity history table and each object can include a field identifying whether or not the feed of that object is viewable to a user.

As previously mentioned, in further embodiments, the user may create a list of objects to which user can view a combined feed of the object and/or user profile feeds in a single list feed. Similar to the subscription to an object feed, a subscription to a list feed provides list feed updates in the user's news feed. The accessibility of these feeds follows similar sharing rules to the objects contained within the list. Accordingly any user can subscribe to any public list, but he/she will not see feed updates in that list for objects to which he/she does not have access. For example, if a user subscribes to a list that includes four objects, only three of which are viewable to the user, the user only sees the feeds of the objects to which the user has access rights.

The following section provides further detail on the various ways in which Chatter® can be implemented to provide added functionality to record sharing across a multi-tenant database system. In particular, the next section provides embodiments in which records can be selected by a user and combined to provide a tailored feed populated by information from those records. Accordingly, various selections of record data can be made visible to interested users across the database.

IV. Chatter Lists

Embodiments of lists are described with reference to FIGS. 6-13.

Lists can provide a mechanism in which each user can view targeted data of interest on the multi-tenant database. The data of interest can be supplied in a feed associated with the user created list, which compiles the feed items, e.g., comments, posts, stories, etc., of the object feeds of the objects in the list. Lists can include entity feeds of objects, such as Accounts, Opportunities, Leads, etc. and child records associated with those objects. Lists can also include profile feeds of user profiles on the database system. Accordingly, a list is collection of objects having an associated feed for the collection.

In this way, a user can create a tailored feed as opposed to all of the followed people and objects being part of just one feed (e.g. the news feed for a user). Thus, a user can organize related information (as determined by the creator, e.g., owner of the list) into one list, and organize other information that is related to a different topic to another list. For example, one list can be created for software developers with whom the owner works, where the list can include records used by software developers and profiles of other software developers. Another list can be of salespersons (e.g. ones with the greatest number of sales) with whom the list creator works.

Another example can include a list created by an account manager wanting to view the progress of a specific Account through feed items associated with the users involved with the Account and the feed associated with the Account. In such an example, user X can create a ist which includes members of two different object types, e.g., accounts and user profiles. For example, the accounts may be associated with South American shipping companies and the users profiles can be those of the individuals associated with those shipping companies. The list may be named, "S. America Ship Accounts." Accordingly, user X can derive more value from viewing the conversations regarding that particular account by viewing the associated feed of the list "S. America Ship Accounts" than by accessing each individual feed of the Accounts and users in that list.

Once a list is created, the list can be shared across the database system with any other user as long as the user has viewing access to the objects within the list. Additionally, the list can be marked as private by the owner, and only visible to the owner. An owner of the list can be any user on the database system. In order to be part of a list, the owner has access rights to the objects, e.g., member, within the list.

Figure 6:
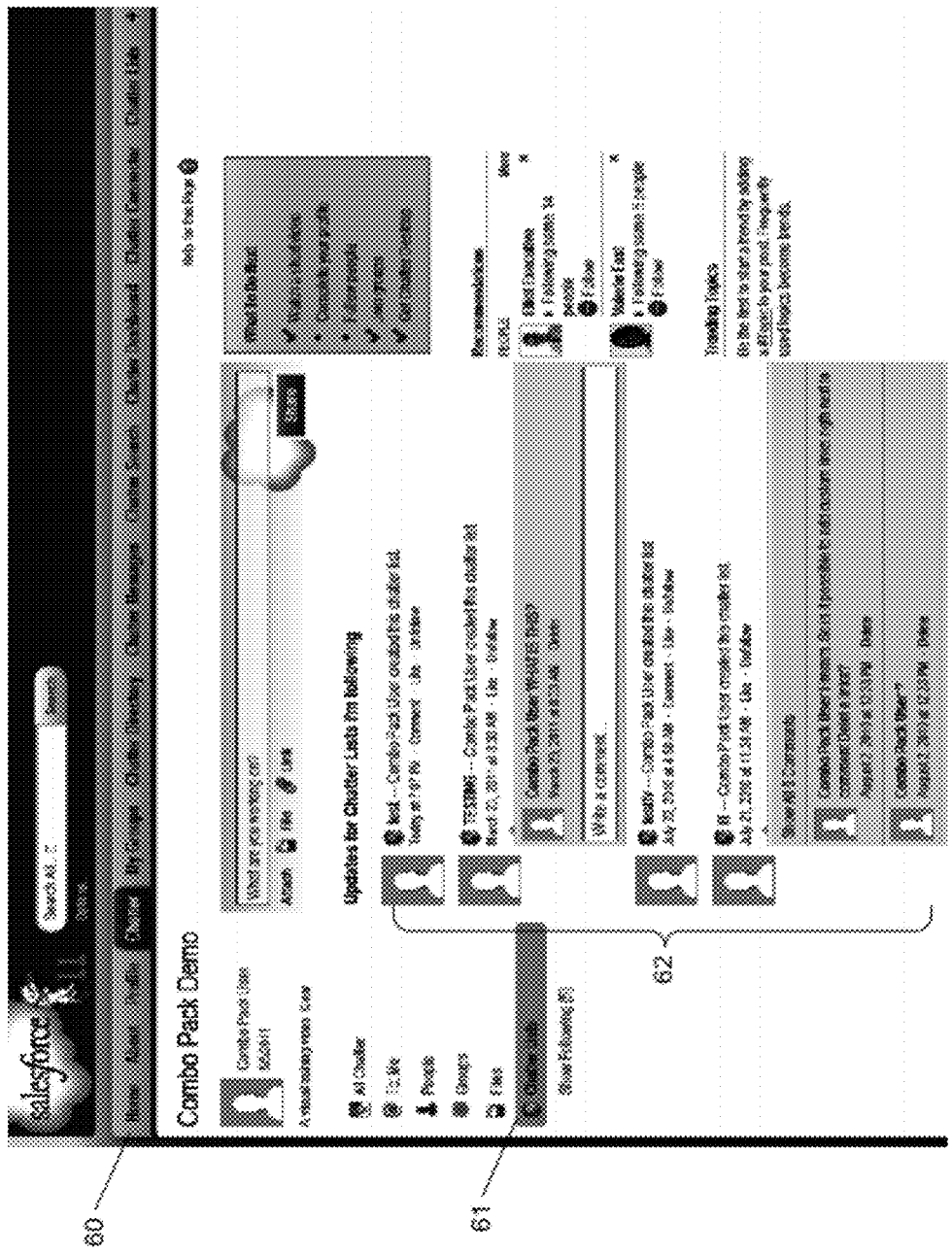
FIG. 6 illustrates an exemplary screenshot of a Chatter® application in an on-demand database system in another embodiment.

FIG. 6 provides an exemplary screenshot of a list application in an on-demand database system. In FIG. 6, a list feed 62 including all updates across a user's lists can be accessible via a sidebar 61 on the user's Chatter® page 60. The lists feed 62 can be created to include a combination of all lists to which a user subscribes, which can include both lists the user created, lists the user is a member and list to which the user is following. In such the aforementioned list, because total feed for all the lists included is combined, overlap of people or objects in one list to another can be identified so that redundant feed elements are not provided in a combined list. In the aforementioned, embodiment, a user can be have viewing access to all objects updates of interest without viewing particular lists and/or viewing all updates to other users and/or objects which the user is following.

Figure 7A:
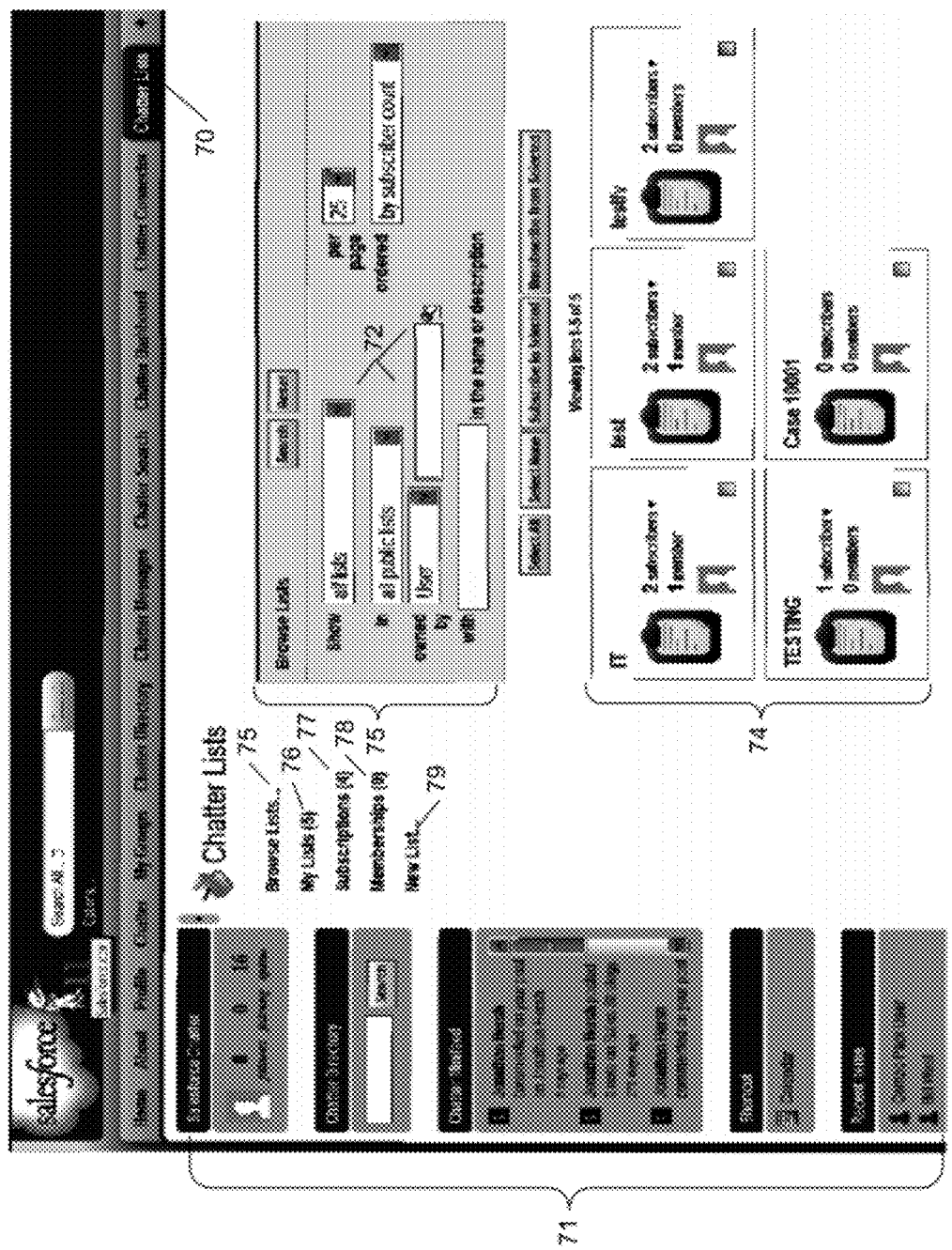
FIG. 7A illustrates an exemplary screenshot of a Chatter® Lists application in an on-demand database system.

FIG. 7A provides an exemplary screenshot of the list application in one embodiment. As shown in FIG. 7A, when a user wants to view, edit or search for particular lists, rather than view a combined feed of the lists followed, a Chatter Lists 70 tab can be selected in the user interface. The Chatter Lists application allows for the user to view particular aspects of lists to which the user has created (e.g., My Lists 76), follows (e.g., Subscriptions 77) or is a member (e.g., Memberships 78). Additionally, the Chatter® Lists application can provide the user with the ability to browse 75 lists created on the database system by other users through various fields 72 and to create new lists 79. When each aspect 76, 77, 78 is selected the lists associated with that aspect are made viewable to the user. These aspects along with the defined terms associated with Chatter Lists are further described in the following paragraphs.

Members of a list include any object on the multi-tenant database which is being followed by the list. For example, when a user creates a list, each object and/or other user, which is added to the list is a member. Only the owner, e.g., the user whom created the list, can add or remove members, which constitute the actual list.

Subscribers of a list can be any user on the multi-tenant database system which follows the list, e.g., subscribes to the list. Accordingly, any number of subscribers can belong to a list on the database as long as a user has access rights to the objects contained in the list. Subscribers of a list will have feed items associated with the objects in those lists included their news feed. Subscriptions 77 include the lists to which a user subscribes, e.g., follows. A user is not required to follow a list that is created by that user. Similarly, a user is not required to follow a list in which the user is a member, e.g., an object does not follow a list.

Figure 7B:
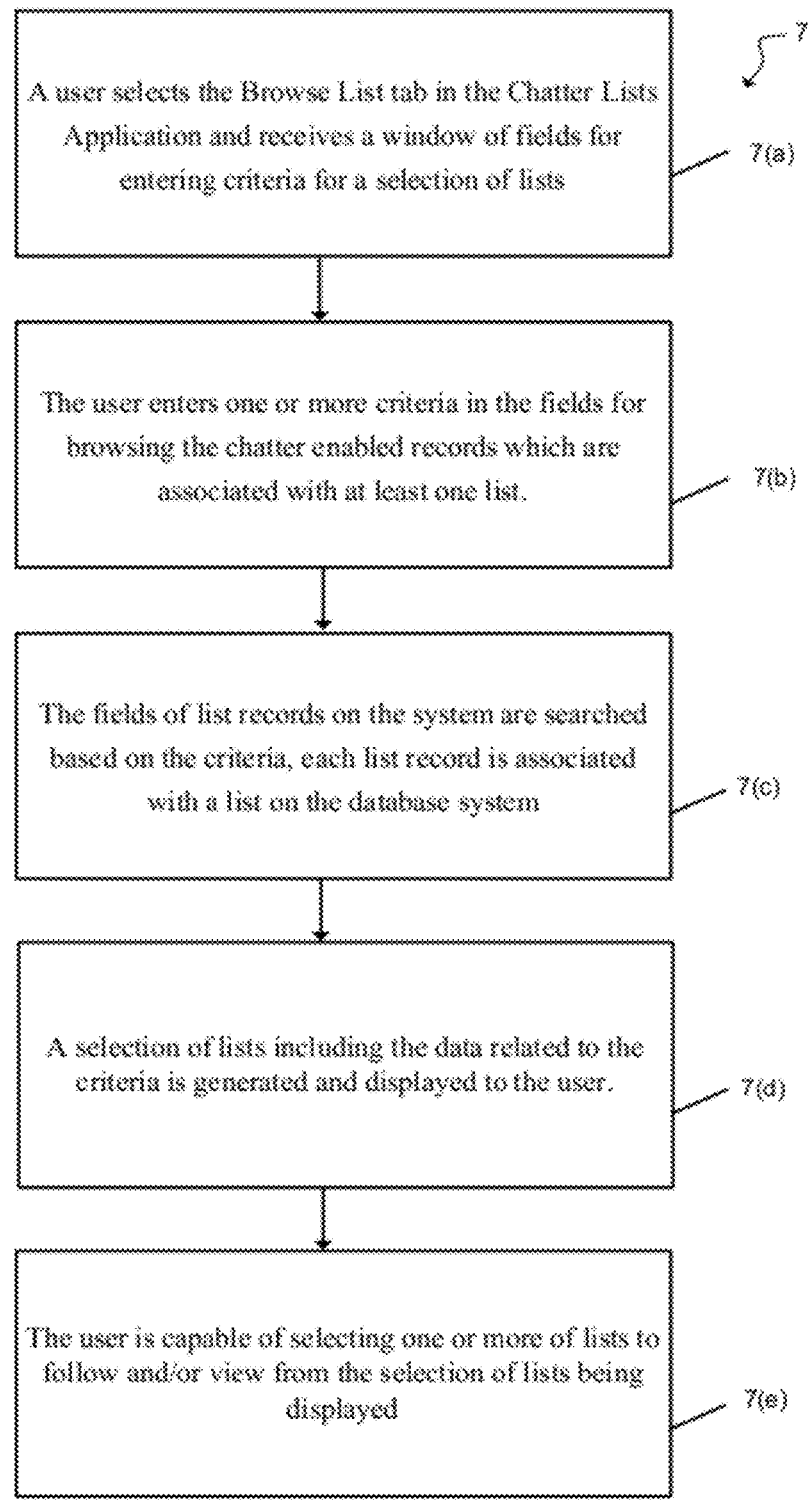
FIG. 7B illustrates a method for browsing Chatter® Lists with the Chatter® Lists application in FIG. 7A.

FIG. 7B provides a method 7 for allowing a user to browse through any list created on the database system is described with reference to the user interface provided in FIG. 7A. Lists of objects to which the user does not have access rights to view, along with private lists created by other users are not visible in the search results associated with the list browsing function.

In step 7(*a*), the browser window can be viewed through selection of the "Browse List" tab 75 on the listing of tabs provided in the List Application window. The browser window can also be the default window shown when a user access the Chatter® List Application. The list browse function includes various fields 72, which can tailor the returned list results. In some embodiments, the fields 72 can include predefined criteria. In other embodiments, the user can enter specific criteria for browsing.

In step 7(*b*), the user enters select criteria for browsing lists on the database system. Each list on the database system can have an associated record with fields defining specific aspects of the list, such as the name, a short description, the owner, the list type (e.g., based on object type), etc. Such criteria are further described in the following paragraph with reference to FIGS. 8A-8D.

Next, in step 7(*c*), when a user enters one or more criteria by which to browse the lists, these fields on the records associated with lists on the database are searched and compared.

In step 7(*d*), the results for the search are returned to the user and displayed in the user interface. Each result can provided a short summary of the list, including the name, subscribers, members. In some embodiments, the matching criteria can be returned for each list and displayed to the user. In other embodiments, the more relevant lists, e.g., the list having the most matched criteria can be displayed first, followed by the lists including only some matched criteria. The results of the browser search can also be determined by the user as one of the selected criteria entered during the search, such as described with reference to FIG. 8A.

Finally, in step 7(*e*), the user can select any number of lists to subscribe to by selecting a box, which is provided within the summary of the list. The user can check any number of boxes and select "subscribe." In this way, the user does not have to manually select and view each list in order to subscribe to the list. In further embodiments, if the user is already subscribed to a list which is returned in the results, an icon indicating subscription (or membership) can be provided within the summary of the list. In other embodiments, lists in which the user is a member and/or subscriber, are not returned when lists are browsed.

Figures 8A, 8B, 8C, 8D:
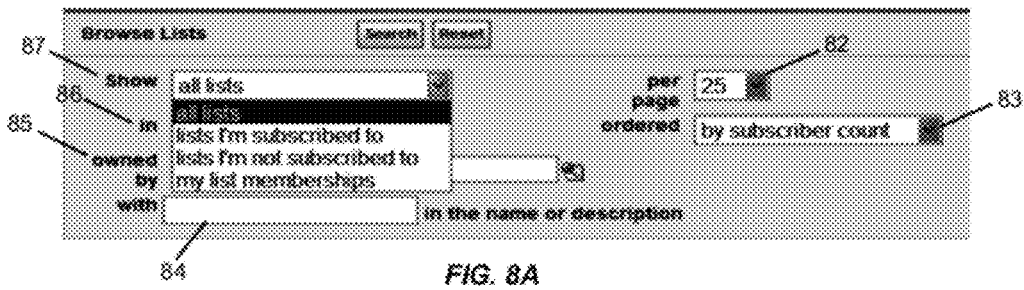
FIGS. 8A-8D illustrate exemplary screenshots of various features of the Chatter® Lists application of FIG. 7A.

FIG. 8A provides an exemplary screenshot of a list browsing user interface 80 in which the user is can select how the results returned from the browsing search are displayed. For example, in the "show" 87 field, the user can select "all lists," which provides all list results matching other specified criteria on the database to be returned, "lists I'm subscribed to," which provides only lists to which the user is following and matching the other specified criteria to be returned, "lists I'm not subscribed to," which provides only lists to which the user is not following and matching the other specified criteria to be returned, and "my list memberships," which provides only list in which the user is a member and matching the other specified criteria to be returned.

The other specified criteria for the list browsing search can include the location of the list 86, the owner of the list 85, a word or phrase search associated with the name or description of the list. If an owner of a list is unknown to the user browsing the lists, an additional link 88 can be selected to perform a search on the users whom are owners of lists, which is further described with reference to FIG. 8D in following paragraphs.

Additional embodiments include returned results display functions, such as how many results are displayed to the user on a page 82 and how the results are ordered 83 on a page. Each of these display functions can have a default value, such as 25 results per page displayed by popularity of the list (e.g., subscriber count). However, these display functions do not affect the results returned in the search of the lists.

FIG. 8B provides an exemplary screenshot of a list browsing criteria in one embodiment. In FIG. 8B, the location, e.g., "In" 86, can be across the entire database system, such as in "all public lists," or with in a specified set of records on the database system. For examples, a user may be part of a team, such as a group of users associated with a specific account, opportunity or other object on the database system. Accordingly, specific lists created by team members may be of particular interest to the user. The user can also browse lists created by users to whom that user subscribes through selection of "lists of people I follow."

FIG. 8C provides another exemplary screenshot of the list browsing interface in an embodiment. As shown in FIG. 8C, the user can further browse lists by owner 85. As each owner of a list can be assigned a different role within a company, each list associated with that owner can be targeted to a specific type of information, such as sales, leads, opportunities won, etc. The owner of a list can include the user, the "queue" (e.g., a collection of users), or another type of user, such as a "partner user" (e.g., portal users). In some embodiments, neither queues nor partner users own lists or use the list application. Accordingly, in some embodiments, this feature is only available for internal users. In other embodiments, the queues and/or partner users can own lists, with partner users having only limited access to the list application through the portal. As shown in FIG. 8C, both of these partner users and queues appear in the "owned by" search option because the organization to which the user belongs has enabled them. Accordingly, in some embodiments, these two options do not appear in the drop down list.

As previously mentioned, if a user is unaware of the owner associated with the lists which are being browsed, the user can select a link proximate to the "owned by" 85 field and a look-up window 88 can provide an additional listing of all users on the database. The list owner user lookup window 88 is provided in FIG. 8D. As shown, a listing of recently viewed users is provided as well as a field 89 in which the user can enter a name, title, email or similar information associated with user profiles.

In further embodiments, additional look-up windows can be associated with the search fields in the list browser in order to offer a user the ability to include search criteria that are unknown to them. For example, a look-up of words used for search criteria and/or categories can be provided search field 84, shown in FIG. 8A, which provides a listing of commonly used words within the descriptions and/or titles of lists. In other embodiments, additional search fields can be provided to the user to return more targeted list results.

Figure 9:
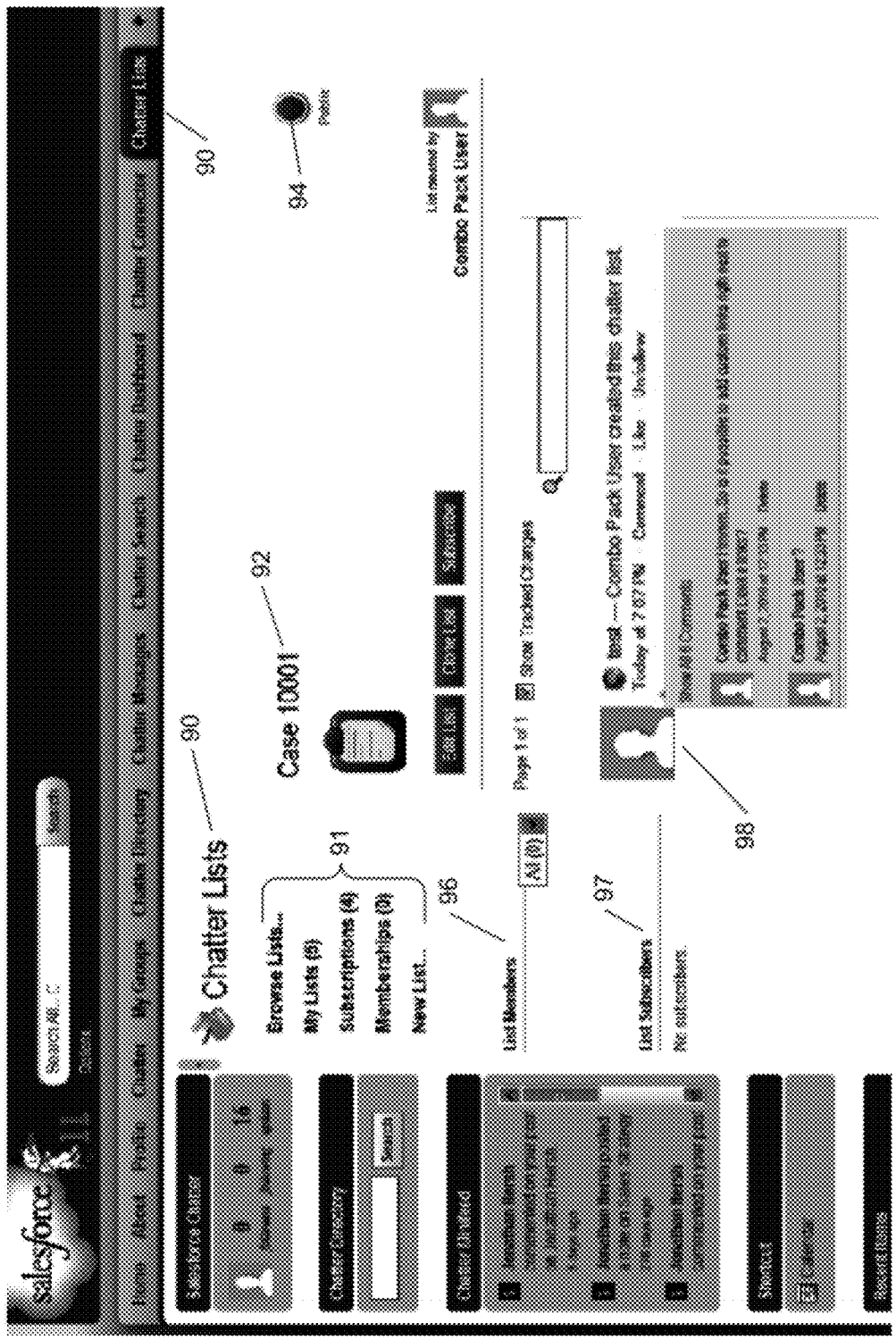
FIG. 9 illustrates an exemplary screenshot of a list in the Chatter® Lists application of FIG. 7A in one embodiment.

FIG. 9 illustrates an exemplary screenshot of a list. As provided in FIG. 9, when a particular list is selected for viewing under the Lists tab 90, the list is presented in the user interface by name 92, e.g., Case 10001. The list includes an indication of the owner 95 and the access rights 94 for the list, e.g., public or private. The access rights to the list are modifiable by the owner 95 of the list. As well, the owner of the list is the only user capable of editing the list, e.g., adding/modifying the name, description, photo, and members of the list. In some embodiments, the owner of the list is not automatically subscribed to the list. For example, a list can be created by an administrator for a group of users to follow, though the administrator has no interest in the list and does not follow the list. In such an embodiment, the list can be moderated by the owner, as each subscriber does not have rights to edit the members or access rights to the list.

As shown in FIG. 9, the user is also shown a listing of the members 96 in the list and the subscribers 97 of the list. The feed 98 associated with the list is also provided to a user viewing the list. The particular list feed is searchable by the user through a field proximate to the list feed. Additionally, a user can chose to navigate away from a particular list he or she is viewing through selection of other list tabs 91, e.g., Browse Lists, My Lists, Subscriptions, Memberships, and New list, which are made available to the user under the Chatter List application tab 90.

Figure 10:
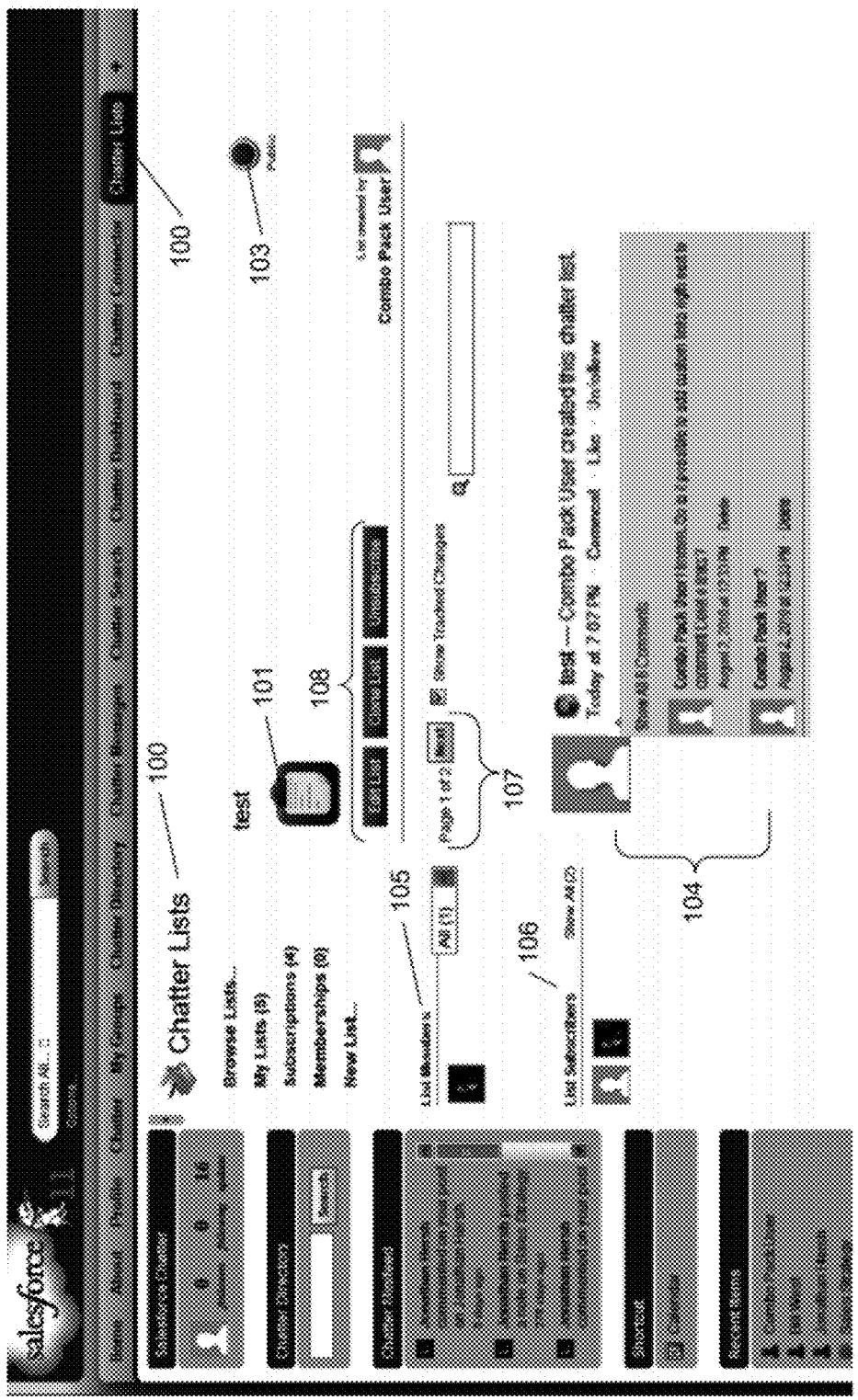
FIG. 10 illustrates an exemplary screenshot of a list in the Chatter® Lists application of FIG. 7A in another embodiment.

FIG. 10 provides an exemplary screenshot of a list having members and subscribers. As shown in FIG. 10, a list 'test' 101 containing subscribers 106 and members 105 is provided under the Lists 100 application tab. The owner 102 of the list, which is user on the database system is shown with a photo from that user's profile. Additionally, the access rights, e.g., 'Public' 103 and editing functions 108 are made available to the user because the user viewing the list 'test' 101 is also the owner 102 of the list. As provided in the list of members 105, a user profile picture is shown as only a user has been made a member of the list. In an embodiment in which an object, e.g., Accounts, Opportunities, Leads, etc. is made a member of the list, the object name can be provided in the listing as the aforementioned object types differ from user profile objects. Additionally, though different object types can be members of the list, only users on the database can subscribe to the list, edit the list and create the list.

The list feed can include both stories from events occurring to the records of the objects which are members in the list in addition to comments and posts by users subscribing to the list. As similarly provided in FIG. 9, FIG. 10 allows a user to search the feed associated with the list via a word or phrase. In embodiments where a feed contains numerous feed items, all of which cannot be displayed on a single page of the user interface, a user can easily jump to pages of the feed through selection of a page number 107 of the feed. In some embodiments, all feed items in the list feed remain in the feed indefinitely. In other embodiments, when a maximum number of feed items is reached, the oldest feed items (and associated items, such as comments on a story) in the list are automatically deleted. In further embodiments, a list owner can select a number of feed items permitted for a list feed or can select the type of story, post, comment, etc. which are to be deleted upon a threshold value of feed items being reached.

Figure 11:
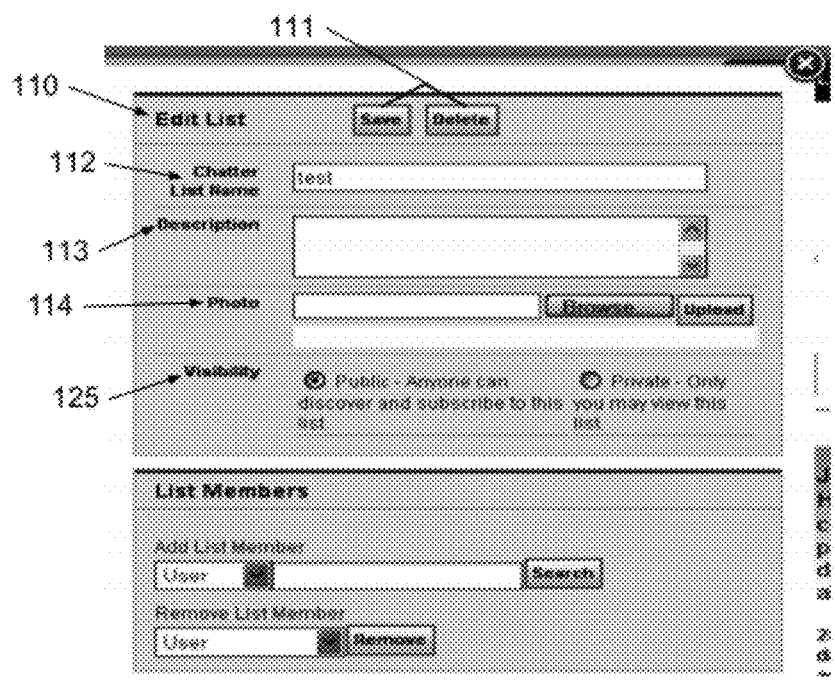
FIG. 11 illustrates an exemplary screenshot of a feature of the Chatter® List application of FIG. 10.

FIG. 11 provides an exemplary screenshot of a list editing window. The window can be made available to the owner of the list when the owner is viewing the list. The editing of a list can include modification or addition of a list name 112 and/or description 113 of the list. Each of the name and description can be limited to a number of words in order to reduce storage requirements on the database system. Similarly, in some embodiments, a photo 114 associated with the list, can be limited in size in order to reduce storage requirements on the database. The photo can include any photo selected by the owner of the list and can be uploaded from a local storage, such as on the owner's computing device. In some embodiments, the photo 114 can default to a standard photo or the photo of the owner of the list if no additional photo is uploaded.

The owner of the list can also edit 110 a list in order to set the privacy settings 115 of the list. In some embodiments, all new lists are defaulted to a public setting if no privacy setting is specifically entered. If the list is public, all data, e.g., feed items, contained in the list is discoverable through a database search of feed related records. Additionally, if the list is public, any user on the database can subscribe to the list and receive feed updates related to the list.

Each element associated with the list, e.g., photo, name, description, privacy setting selection, etc. is not mandatory in order to make a list. If a user provides just one element, such as a name, a list can be created having default settings applied, e.g., not photo and public accessibility.

In some embodiments, if a user is the owner of multiple private lists, the user can select which lists to make visible within his or her feed. Accordingly, selected groupings of record feeds can be made visible to the user on demand, without providing similar information to other users. For example, if user Y is closely watching an Opportunity as well as the potential users having interest in that Opportunity, user Y may not want the users having interest in the Opportunity to be made aware of any interest due to possible competition.

In further embodiments, the lists may be accessible only to users by invitation from the owner of the list. In such an embodiment, the owner can email an invitation to user having possible interest in the lists and the privacy settings of the lists can remain marked as "private," but the list can include a plurality of invited subscribers.

In other embodiments, an owner editing a list may be provided with the ability to group together multiple lists in order to receive a combined feed of those grouped lists. In such an embodiment, an additional field may be made available on the list editing window which provides a listing of all lists owned by the user and to which the current list, e.g., the list being edited can be linked through selection the additional lists.

Referring again to FIG. 11, an owner editing a list also is provided the ability to 'Add List Member' to and 'Remove List Member' 116 from the list. The adding function provides a listing of the types of objects, e.g., user, opportunities, leads, accounts, etc. offered on the database system which are Chatter® enabled and capable of being added to a list. Once a user selects a type of object for addition to the list, the user can enter a search term, e.g., word or phrase, to search for related objects and records. If a user is unable to view a certain object, e.g., Account X, this object will not appear for selection during a search of objects to be added as a list member. If a user chooses to remove, or delete, a member from the list, a drop down listing of the members in that list can be provided and the user can select one or more members, e.g., through highlighting, to remove from the list. In other embodiments, where numerous members are part of the list, a similar two field approach, e.g., object type field and search field, can be offered to a list owner to select a member for removal.

Finally, when an owner of a list is editing the list, the owner has the capability to 'Save' 111 the present edits on a list or 'Delete' 111 the entire list.

As briefly discussed in previous paragraphs, Chatter® settings, for sharing, visibility and privacy across users are followed through lists along with other applications in Chatter® which are discussed in the following section. Accordingly, if a user does not have access rights to delete a comment or view an Account object, those sharing rules similarly apply to the lists created by users. However, all user profiles are publicly available, so each user on the database system has access to view other user profiles and add any other user to a list or subscribe to any other user on the database system.

Figure 12:
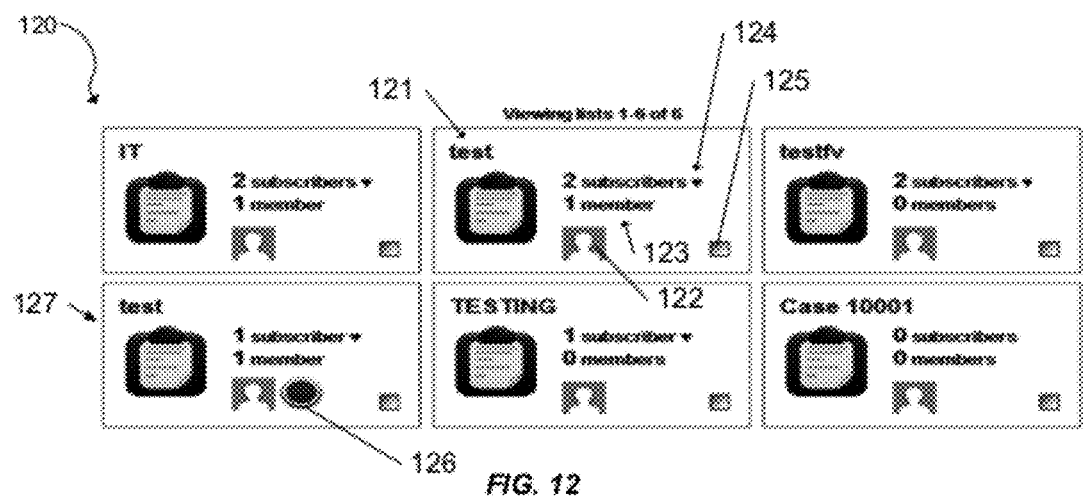
FIG. 12 illustrates an exemplary screenshot of another feature of the Chatter® List application of FIG. 10.

FIG. 12 provides an exemplary screenshot of an embodiment of a group of lists 120 displayed to a user. In this embodiment, the owner of a list has selected to 'Clone' 108 the list 'test' 101 shown in FIG. 10. In some embodiments, similar to the editing of the list, the cloning function can be only performed by a owner 122 of the list. However, in other embodiments, a user capable of viewing the list can clone the list and be an owner of the cloned list. For example, if a list owned by user Z provides six objects of particular interest to a user A, but user A would like to add two additional objects to that list, user A can clone the list and become an owner. Once user A is the owner of the cloned list, user A can add the two additional objects and edit the list. When a list is cloned, the cloned list is automatically set to private. As instances of the same exact list cannot be made available on the database system, at least one varying field is provided. Accordingly, if the user cloning the list, edits the list to include a different name, members, etc., the privacy settings can also be edited.

When a list is cloned, the new list 127 can appear in the user's interface as the same list, having a same name 121, same members 123, etc., but only the user cloning the list is included as a subscriber. If a user of a list is subscribed to that list an icon 124 is provided next to the subscriber number count. This is because subscribers 123 following the cloned list are not automatically subscribed to new list, each subscriber is free to elect which lists to subscribe to and other users are not permitted to subscribe another user. If an owner of a cloned list is also the owner of the new list, the owner's profile picture 122 will similarly appear on the summary of the new list. Similarly, as shown in FIG. 12, an indication that the list is 'Private' 126 is provided, which differentiate the new list 127 from the cloned list. Any list which is made available to a user, e.g., the user has access rights to view, include a radio button which can be selected for the user to subscribe to the list. As mentioned previously, an owner of a list is not required to follow, or subscribe to, that list and only a user that is the owner of a private list can subscribe to that list in most embodiments.

Figure 13A:
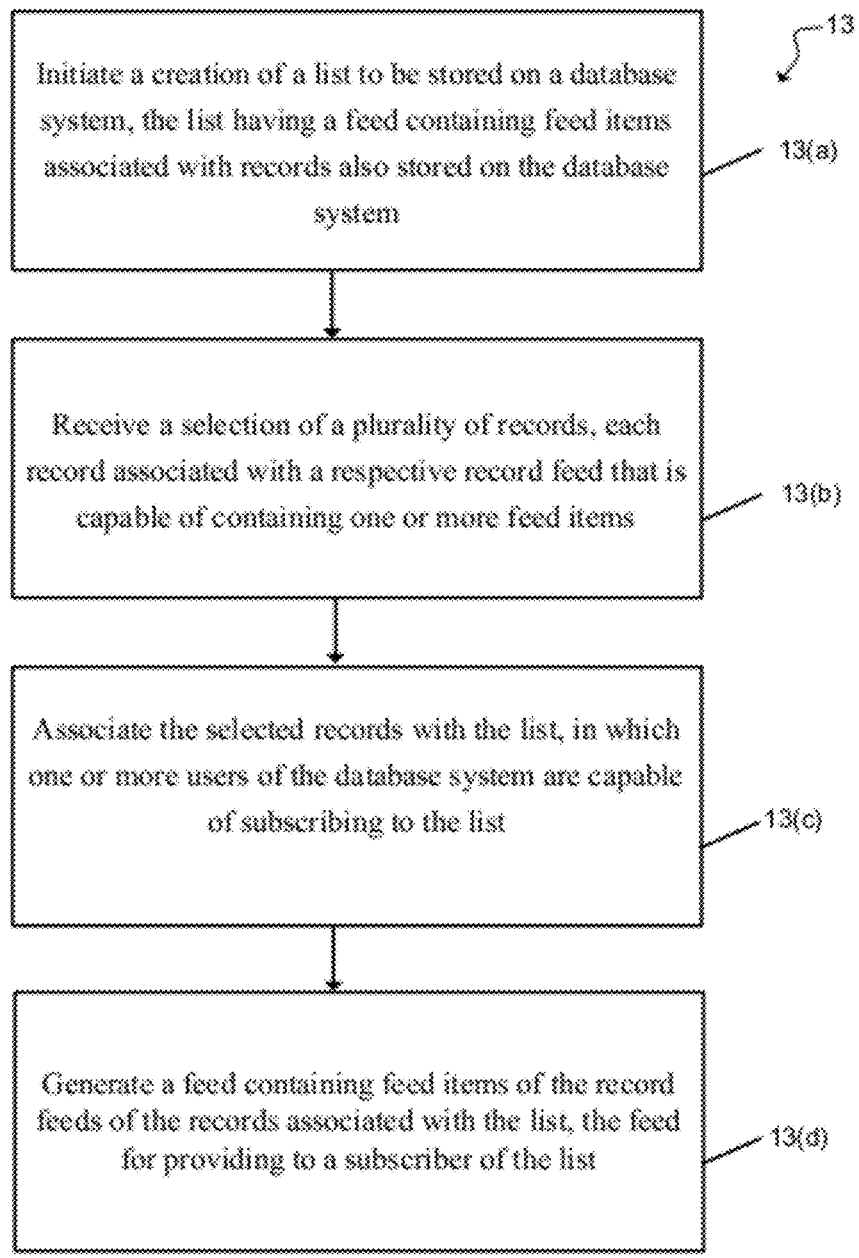
FIG. 13A illustrates a method for creating a new list in the Chatter® List application in an on-demand database system.

Referring now to FIG. 13A a method 13 is provided for creating a new list. Method 13 is described with reference to FIG. 13B.

Figure 13B:
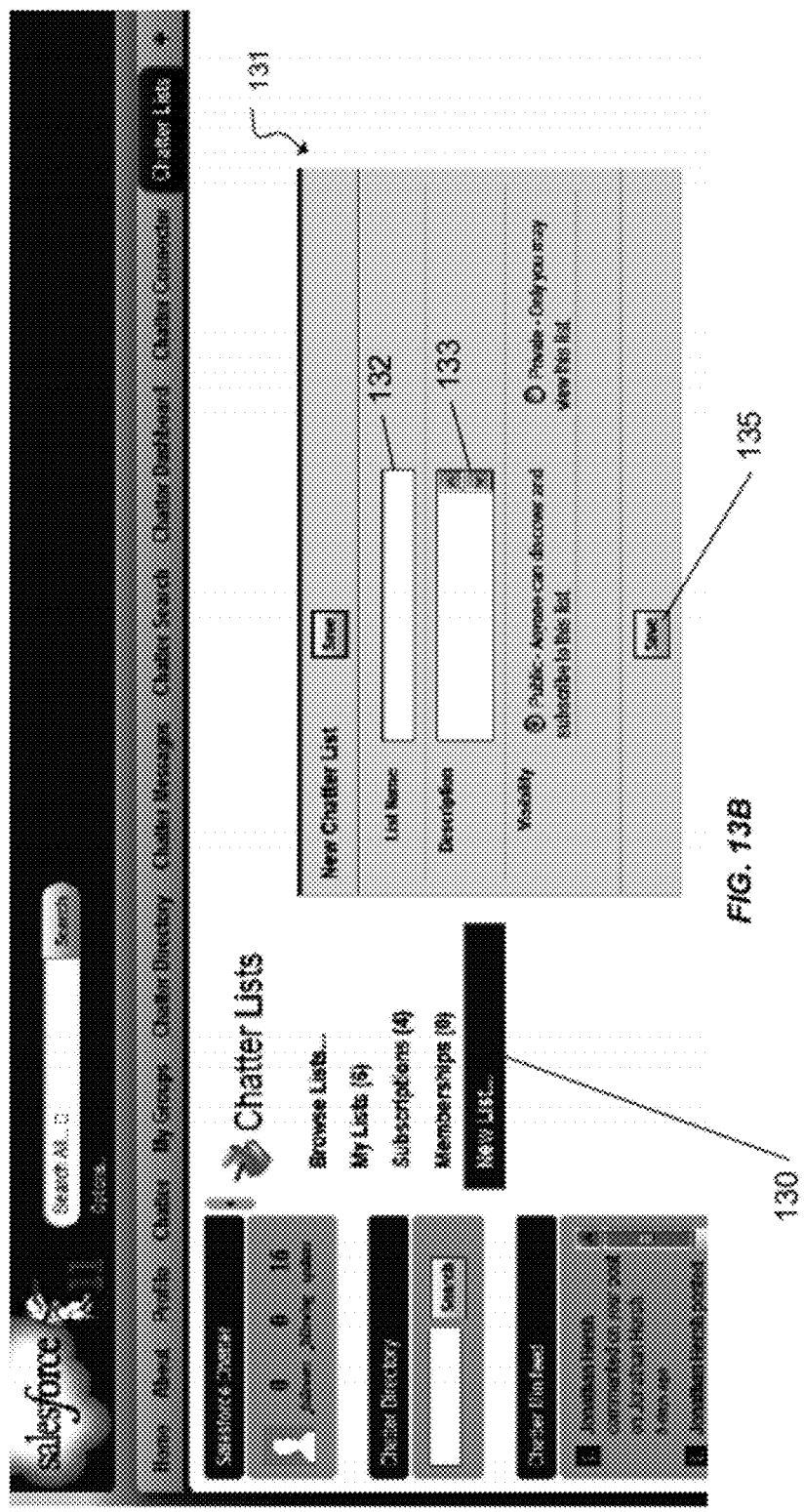
FIG. 13B illustrates an exemplary screenshot for the user interface for creating a new list in the Chatter® List application in an on-demand database system.

FIG. 13B shows a user interface for creating the new list. In step 13(a), the new list window 131 can be viewed after selection of the 'New List' tab 130 in the sidebar listing of tabs associated with the Chatter List Application, which initiates the creation of a new list in the database system. The initiation of the new list can cause a record of the list to be created and stored on the database system. The new list record can be Chatter® enabled and have an associated feed. When creating a list, a user is able to enter both a list name 132 and list description 133. However, both of these fields are not required in order to create a new list. In some embodiments, a user may fill both fields in order to differentiate a list containing similar members or having a similar name. Additionally, a user is able to select the visibility 134 of the list to other users on the database system. As previously discussed, a default setting of 'Public' visibility can be decided for new lists created in which a user does not specify a visibility for the list.

In some embodiments, the window 131 provided for a new list can include additional fields, such as those offered in the edit list window 110 provided in FIG. 11. In such an embodiment, in step 13(b) the user can select the members of the list when creating the new list, such as illustrated in FIG. 11 in fields 116. In some embodiments, multiple fields can be provided at one time. For example, the user can select a button which offers "add another member," which offers an additional member to be added in the same window. As previously discussed each member is an object or user profile that is Chatter® enabled and has an associated record for a feed containing feed items.

In step 13(c), the new list is created by associating the records of the selected members with the list. If the user has selected that the new list is a public list, any user on the system can subscribe to the list. However, if the user has selected that the new list is a private list, only the user creating the new list can view the new list.

Next, in step 13(d), a new list feed is generated. The new list feed can be seen when the particular list is selected for viewing by a subscriber who has access rights to view the list. Additionally, the feed items associated with the list can appear in the news feeds of the users who subscribe to the list. The feed items in the new list feed are the feed items from the feeds of the records associated with the new list. The new list feed can be dynamically populated at runtime for any standard or custom object in the database system which is associated with the list.

In one embodiment, lists as described above are manually created by a user. Accordingly, each list can differ from another. In some embodiments, if a user attempts to create a list which is identical to another user's list, the user can be presented with a window indicating that the list already exists and offering the user to subscribe to that list and/or clone that list for user-specific customization and control of the list.

In step 13(e), users on the database can search and subscribe to lists on the database system. The list can be created by any user on the database system and the list can contain any number of related object records. The user can search the lists based on a specific criteria, e.g., a name or word in the description, an object type, etc. and when the results of lists are returned to a user, the user can select to subscribe to that list. If a user is already subscription to a list in the returned list results, the user is provided with the option to unsubscribe to that list. In the embodiment where a user begins to subscribe to a list, once the subscription begins, updates to the feed of that list are posted to the subscribing user's feed. In the embodiment where a user unsubscribes to a list, the user no longer receives feed items in his/her user profile feed regarding that list. In some embodiments, previously posted feed items from the unsubscribed list, e.g., during the user's subscription to that list, remain in the user's profile feed. In other embodiments, all feed items relating to that list are removed from the user's profile feed upon unsubscription.

In further embodiments, for new Chatter® users, when fields of the user's profile are completed, a group of suggested lists can be presented to the user. Accordingly, any field available through the user API can be keyed off of to make a suggested list or a list of similar items. In another embodiments, if a user B is following a record on the database and that record is part of a list created by user B or another user on the system, then user B can automatically follow the list containing that record or any related record, such as a child record of a parent object to which the user subscribes.

V. Chatter Directory

Figure 14:
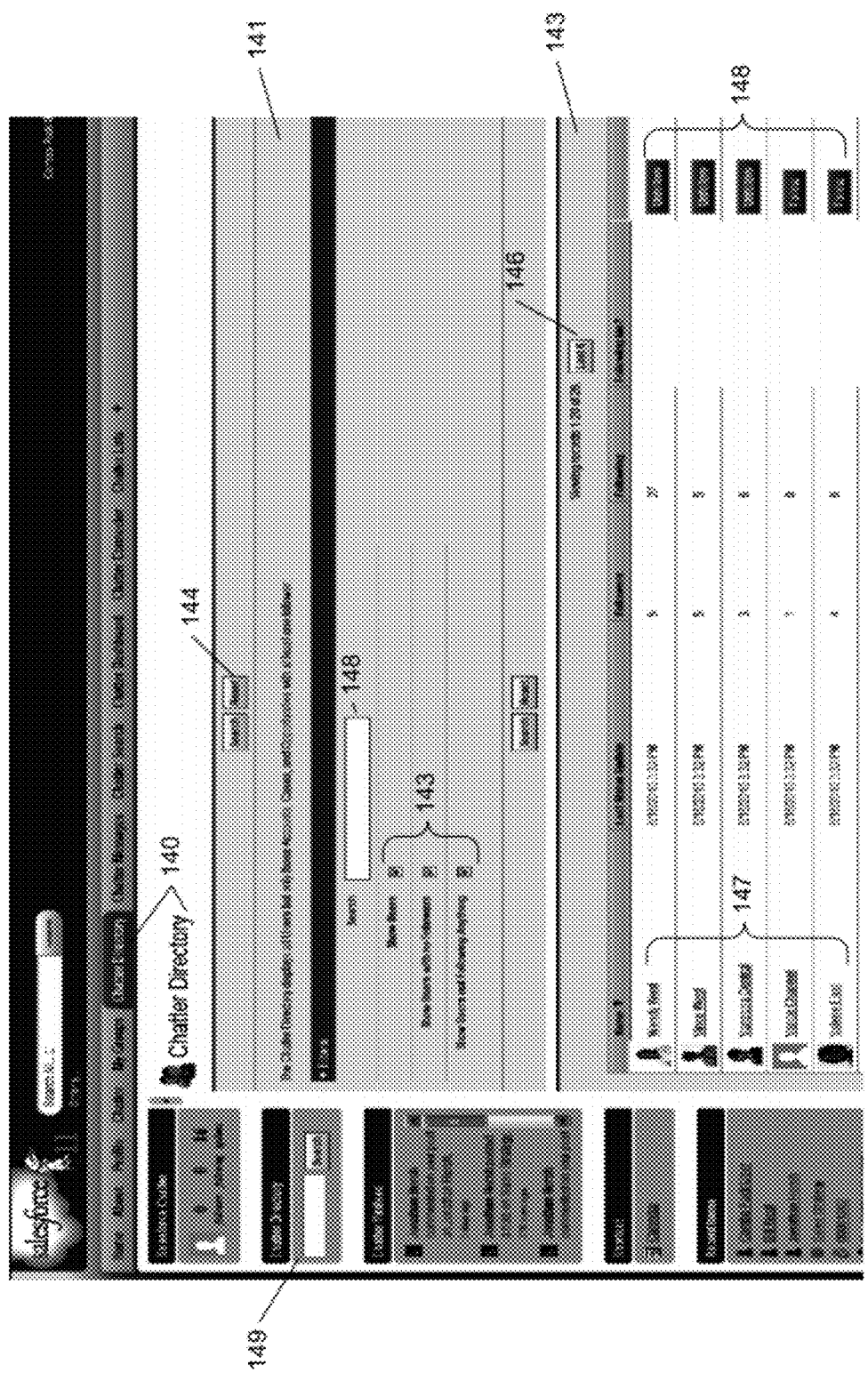
FIG. 14 illustrates a screenshot of a Chatter® Directory application in an on-demand database system according to embodiments.

FIG. 14 illustrates a screenshot of a Chatter Directory application in an on-demand database system according to embodiments. Directory 140 can provide a mechanism in which various object types, e.g. Accounts, Opportunities, Cases, etc. and all users on the on demand database system are searchable based on entered text 148, e.g., name, and other filters 143, such as the number of subscriptions, "all users," "users with no followers," and "users not following anything." Each search returns a listing of the results 147, including a name and profile picture, e.g., for user profiles, and a name if the results is an object. The results listing also provides the user with information such as the date and time of most recent modification, e.g., "update" to the record feed and the number of subscriptions, e.g., "followers," "following," "following me?" for those results. If more than a predefined number of results are returned, multiple pages can be provided, and the user can flip 146 through pages to view records of the results. The user can select any record in the results to view the feed related to that record, e.g. a user profile or an object feed. After each search is performed, the user can reset 144 the search engine and perform another search. In some embodiments, when a user navigates away from the Chatter Directory application, the search fields are automatically reset.

VI. Chatter Dashboard

Figure 15:
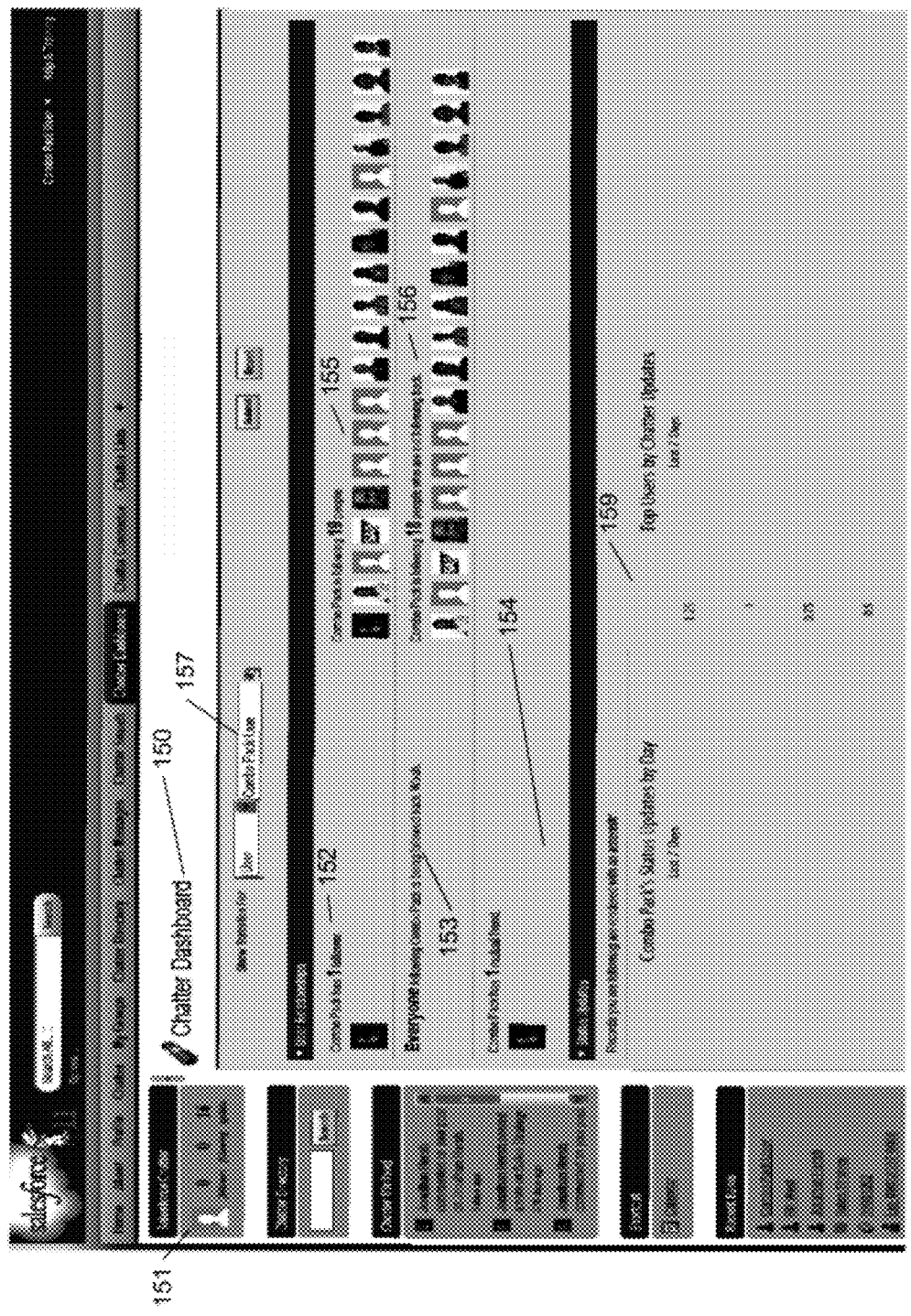
FIG. 15 illustrates an exemplary screenshot of a Chatter® Dashboard application in an on-demand database system.
Figure 16:
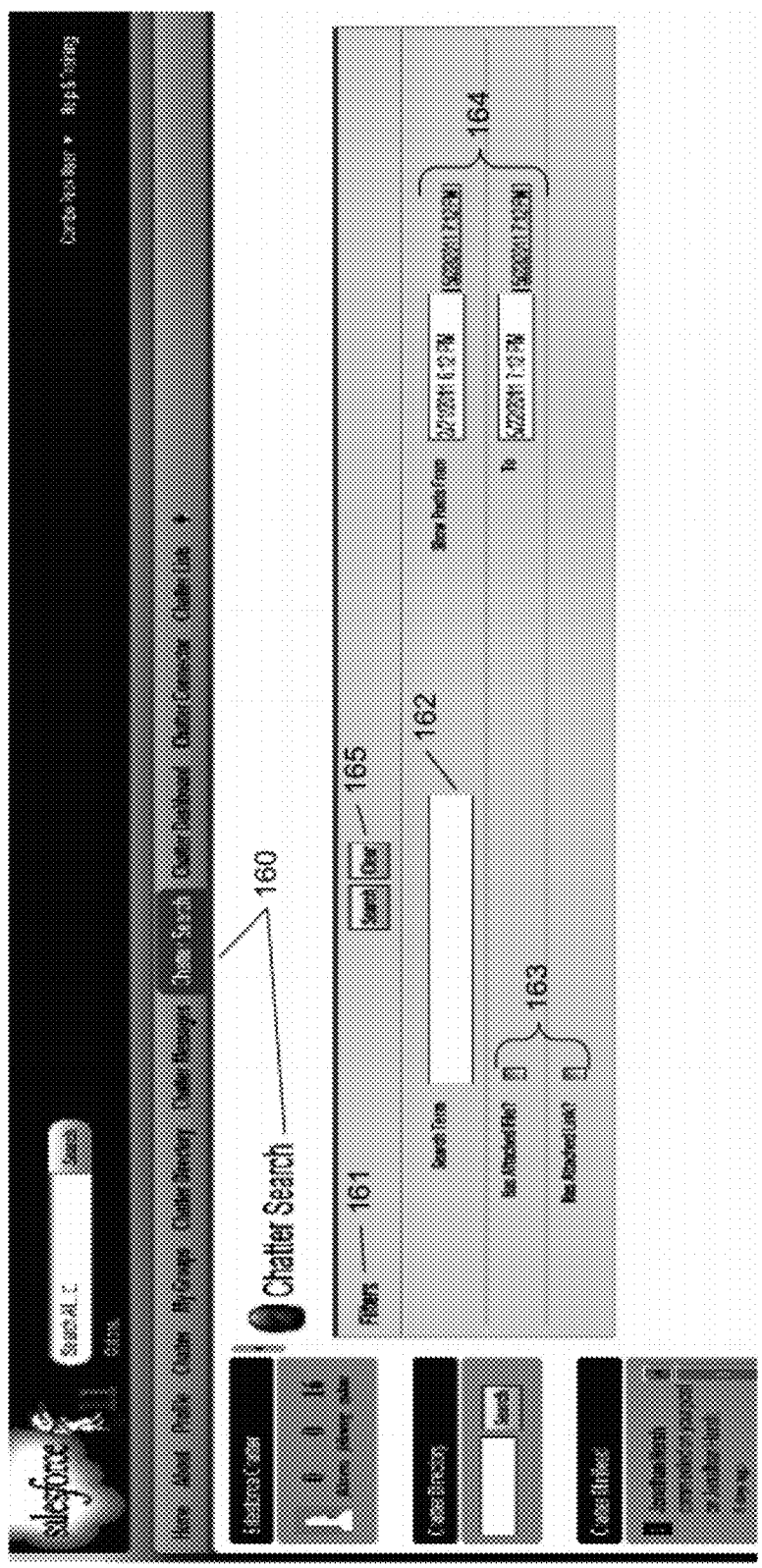
FIG. 16 illustrates an exemplary screenshot of a Chatter® Search application in an on-demand database system.

FIG. 15 provides an exemplary screenshot of a Chatter Dashboard application. Dashboard 150 can offer a customizable view of the user relationships based on user subscriptions, e.g., who is following who. For example, whichever user 157 is keyed, a summary of that user's relationship is displayed. The keyed user's 157 followers are listed 152, the people the keyed user is following 155 are listed and the users that the keyed user 157 is following but are not following back 156 are listed. Additionally, the user that are following the keyed user 157 but are not being followed by the keyed user 153 are displayed. Any further relationship, such as user friendships 154 can also be displayed.

Dashboard 150 can also provide a set of predefined analytics 159 with regard to a keyed user and with regard to the relationships of the user who is accessing the dashboard. For example, some predefined metrics can include charts and graphs relating to "Most Active Cases This Week," "Most Active Accounts This Week," and "Most Active Opportunities This Week," which provide metrics of the updates on the records of the Cases, Accounts and Opportunities which the keyed user 157 is associated, e.g., subscribes to, in the database system. Another metric can include "Most Active Contacts," which displays a graph of the users which the keyed user is following that have the most updates, e.g, posts, comments, etc. in their feed. Other metrics can include a chart of a weekly overview of the keyed user's 157 "Status Updates By Day" and the "Top Users by Chatter® Updates," which providing a metric of the users across the database receiving the most updates in a NewsFeed.

VII. Chatter Search

Search 160 provides a search engine in which enabled records are searchable based on a term 162 entered and other predefined filters 161. This offers a user great flexibility to search records when data in a specific field is unknown. For example, a user may wish to search for an Account related to video cards for mobile phones, but does not know the name of the company. The user can enter "video card mobile phone" and all fields of Chatter® enabled records are searched. Additionally, the user can enter a specific time frame 164 for which feed items, e.g. posts to a Chatter® enabled record are searched. Accordingly, if the user is aware of a post viewed three days prior, but does not remember in which feed the post was made, the user can enter a search term and the time frame of three days. In further embodiments, the user can filter the search for posts including links and files 163. After a search is performed, the user can "clear" 165 the filtering criteria before performing another search.

VIII. Chatter Connector

Figure 17A:
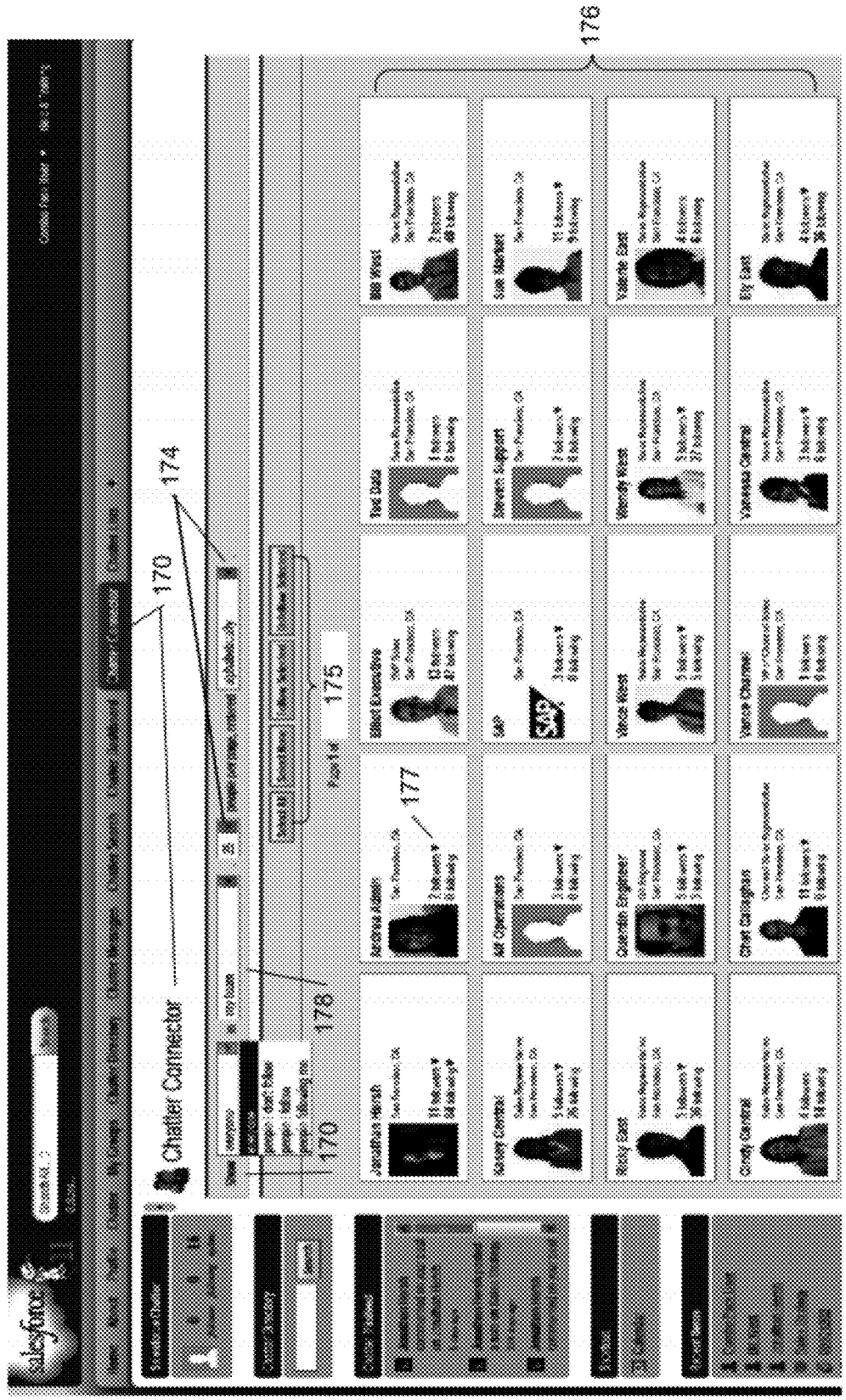
FIG. 17A illustrates an exemplary screenshot of a Chatter® Connector application in an on-demand database system.
Figure 17B:
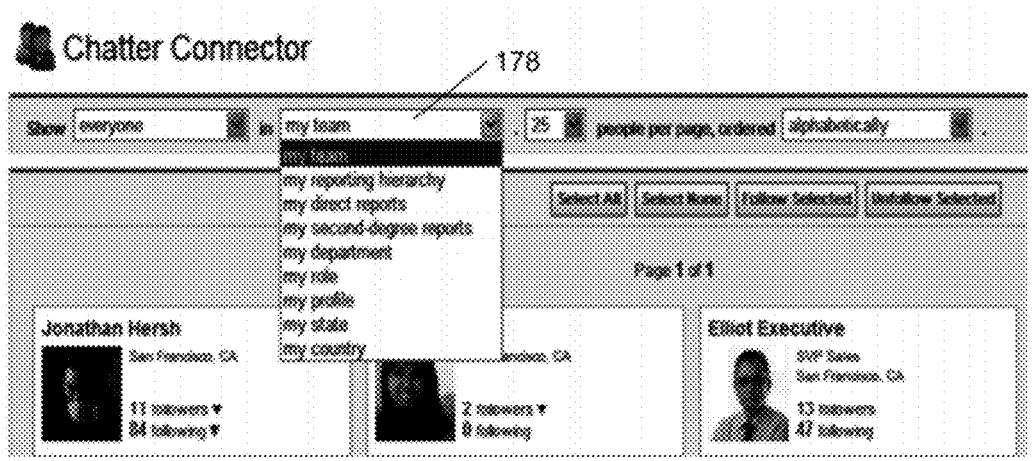
FIGS. 17B-17C illustrates exemplary screenshots of various features of the Chatter® Connector application in FIG. 17A.
Figure 17C:
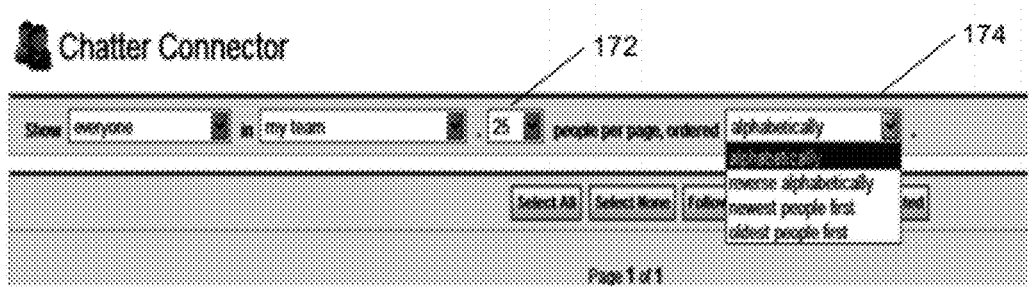

Chatter Connector is described with reference to various embodiments as depicted in FIGS. 17A-17C. In one embodiment, the connector interface 170 can be selected through an application tab in the user interface. Connector 170 provides users with a capabilities 175 to easily select multiple users to subscribe to (e.g., "follow") and deselect and unsubscribe (e.g., "unfollow") to other users on the database system based on predefined filters which are specific characteristics of users and objects on the system. As shown in FIG. 17A, a user interface is provided in which a listing 176 of user profile summaries is shown. As shown, each of the summaries each provide general information, such as the number of followers and the number that user is following. If the user viewing these summaries is a follower, an icon 177 can be provided for indication of an existing subscription. Information such as the user name, title and location can be provided in the user summaries. Additionally, a number of filters 170, 178, 174, are provided for viewing a particular listing of users. Filters are searches based on fields of user profile records which are compiled during run-time. As shown, filter 170 provides a user with the ability to search other users based on subscription. For example, filter 170 provides a user with a way to filter users on the system by all users ("everyone"), who that user subscribes to ("people I follow"), who subscribes to that user ("people following me") and who that user does not subscribe to ("people I don't follow"). Filters 178 and 174 are further described with reference to FIGS. 17B-C.

FIG. 17B provides an exemplary screenshot of the filters available in the connector application, a user can also search predefined user field based on user-related information such as, other users within a user's team ("my team"), a user's reporting hierarchy ("my reporting hierarchy"), a user's direct reports ("my direct reports"), a user's secondary reports ("my second-degree reports"), a user's department ("my department"), a user's role ("my role"), e.g., users having a similar position within a company. Other fields include a user's profile ("my profile"), e.g., all users subscribing to that user and all users that users subscribes to, a user's state ("my state") and a user's country ("my country"), each of which provide a location based filtering.

FIG. 17C provides an exemplary screenshot of user-definable features available in the connector application. The display of the filtered user listings can also be selected by a user. As shown in FIG. 17C, the user can choose the number 172 of other users matching the filtered criteria. For example, the user can choose to display 25 users, 50 users or all users in the database matching the filtered criteria. Additionally, a user can select how the results are displayed, such as "alphabetically," "reverse alphabetically," "newest people first" e.g., newest users on the system, and "oldest people first" e.g., oldest users on the system.

Referring back to FIG. 17A, once a user has the desired filtered results displayed, the user can select to subscribe to all of the users displayed, or unsubscribe, such as in the case where a user filters other users to which he or she is subscribed ("people I follow") based on secondary criteria, e.g., "my team." This could be useful, for example, if that user switches teams and/or roles in a company and no longer needs to follow a specific group of users.

IX. Additional Embodiments

Figure 18:
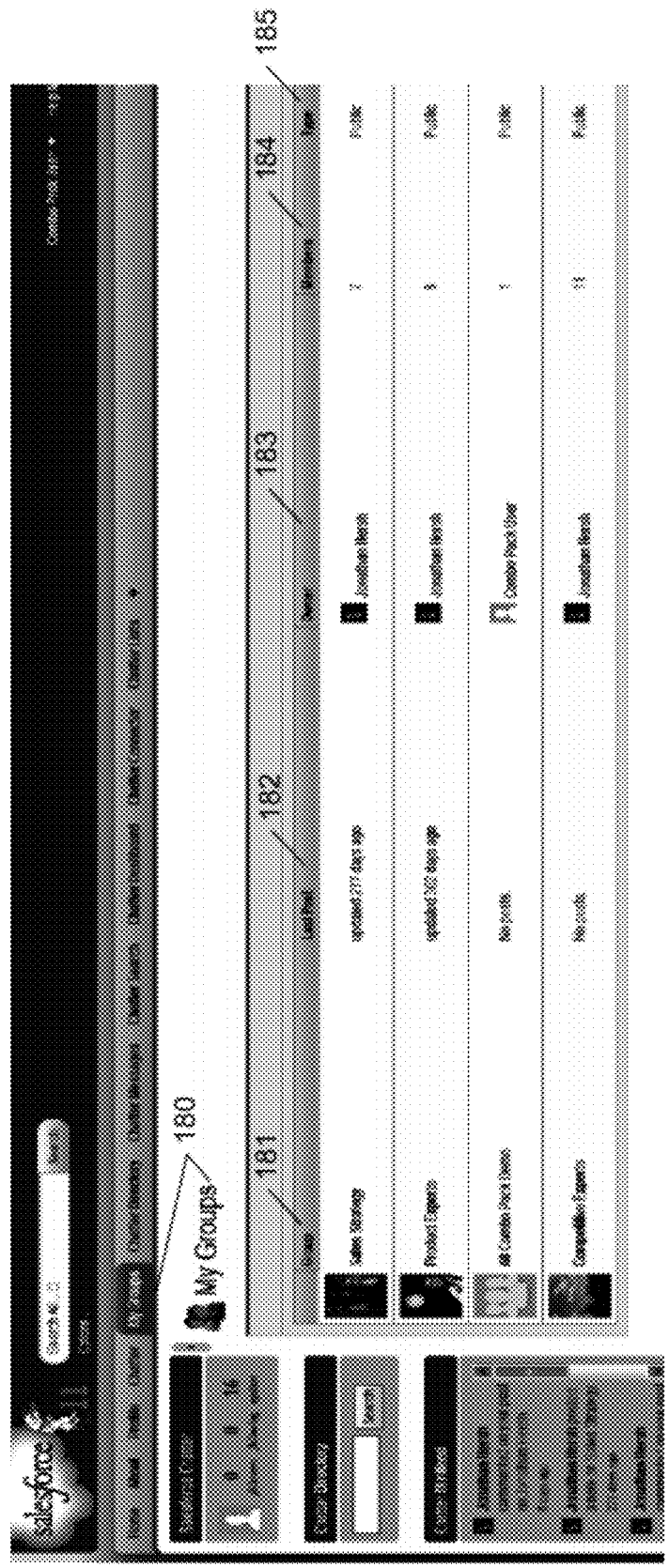
FIG. 18 illustrates an exemplary screenshot of a My Groups application in an on-demand database system.

FIG. 18 illustrates an exemplary screenshot of a My Groups application. My Groups 180 provides a user interface in which each group 181 to which a user subscribes to is provided. The groups can be ordered by the date of the last post 182 made within the feed for that group 181, and display relevant information for that group, such as the owner of the group 183, the number of members in the group 184, and the type of group 185, e.g., "public" or "private".

Chatter Messages provides a private messaging system in which one user can send a message to another user without other users viewing the message. This type of functionality is similar to an electronic mail message (e-mail) between two or more users on a system. In most embodiments, these messages are not posted in a feed and nor are they commentable.

In other embodiments, a selection of sidebar applications are provided within the user interface as a quick reference to a user. For example, a simplified version of the user profile is provided, which displays the user's profile picture, the user's name and the user's subscriptions, e.g., "followers," "following," and recent modifications "updates" to records which that user is following.

Another sidebar application can include a Chatter Directory search, which filters user profile objects based on a user name field. In further embodiments, the Chatter Directory can search any object on the database based on a object record name, title and/or description field. The sidebar search application is simplified version of the Chatter Directory provided in FIG. 14.

A Notifications sidebar application provides a simplified feed which is optimized for the sidebar. The formatting of the feed differs from a user's NewsFeed because only comments relating to that user, e.g., actions on that user are provided. For example, any comments on that user's profile page, comments made in response to that user's posts, or comments made on that user's posting in another user's profile feed, can appear in the Notifications sidebar application.

A MiniFeed is also provided which a listing of the most recent feed items within a user's NewFeed. For example, the last 5 stories, postings, comments, etc. that were provided in a user's profile feed can be shown in the user's MiniFeed sidebar application. In some embodiments, a user has the ability to modify which feed items appear in his/her Mini-Feed.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

It should be understood that the present invention as described above can be implemented in the form of control logic using hardware and/or using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A system for providing an enterprise social network feed containing feed items associated with a configurable list of customer relationship management (CRM) records, the system comprising:

a database system implemented using a server system, the database system configurable to cause:

processing, using the database system, data identifying a subset of a plurality of CRM records stored as data objects in the database system, each CRM record being related to a respective business task and/or business relationship, the subset of CRM records selected by a first user of an enterprise social networking system associated with the database system, the CRM records being independent of user profiles of users of the enterprise social networking system, each CRM record associated with a respective one of a plurality of record feeds of the enterprise social networking system, each record feed configured to share CRM record-specific feed items related to the CRM record associated with the record feed, each CRM record capable of being independently subscribed to by users of the enterprise social networking system to cause the CRM record-specific feed items related to the CRM record to be shared in news feeds of the users subscribed to the CRM record;

providing, using the database system, a list stored as or identified using data objects in the database system, the list defined by the user-selected subset of CRM records, the list being an entity independent of the CRM records, the list capable of being independently subscribed to by users of the enterprise social networking system to cause list-specific feed items related to the user-selected subset of CRM records to be shared in news feeds of users subscribed to the list, the list-specific feed items comprising CRM record-specific feed items of the subset of CRM records;

storing, in a database of the database system, identifications of users subscribed to the list;

processing a request, from a second user of the enterprise social networking system, to initiate a following relationship with a first CRM record in the subset of CRM records, the initiation of the following relationship automatically triggering a subscription of the second user to the list;

processing a selection of the list when the list is identified in a user interface on a device associated with the second user;

displaying, responsive to the selection of the list, an enterprise social network feed dynamically populated to contain the list-specific feed items;

processing a further request, from a third user of the enterprise social networking system, to initiate a following relationship with a second CRM record, the second CRM record not being in the subset of CRM records, the third user not being a subscriber to the list;

determining, responsive to processing the further request, that the second CRM record has a parent-child relationship with the first CRM record;

automatically subscribing, responsive to determining that the second CRM record has a parent-child relationship with the first CRM record, the third user to the list;

processing a comment by the third user, the comment relating to a third CRM record, the third CRM record not being in the subset of CRM records; and displaying, on a device of a fourth user of the enterprise social networking system, the comment, the fourth user being a subscriber to the list, the fourth user not having a following relationship with the third user.

2. The system of claim 1, wherein the subset of CRM records is associated with one or more of the user profiles.

3. The system of claim 1, the database system further configurable to cause:

associating the subset of CRM records with a second list.

4. The system of claim 1, wherein:

users capable of subscribing to the list comprise an owner of the list, and the list is a private list.

5. The system of claim 4, wherein users capable of subscribing to the list have received an invitation to subscribe to the list from the owner of the list.

6. The system of claim 1, the database system further configurable to cause:

identifying one or more users subscribed to the first CRM record; and automatically subscribing the identified one or more users to the list.

7. The system of claim 1, the database system further configurable to cause:

processing one or more identifiers for the list; and storing the one or more identifiers in the database system.

8. The system of claim 1, the database system further configurable to cause:

processing an update to the list;

generating a story for the update; and posting the story to a feed associated with a subscriber to the list.

9. The system of claim 1, the database system further configurable to cause:

processing comments on the list-specific feed items.

10. A computer program product comprising a non-transitory computer readable medium storing computer-readable program code capable of being executed by one or more processors to cause operations for providing an enterprise social network feed containing feed items associated with a configurable list of CRM records, the program code comprising instructions configurable to cause:

processing, using a database system, data identifying a subset of a plurality of CRM records stored as data objects in a database system, each CRM record being related to a respective business task and/or business relationship, the subset of CRM records selected by a first user of an enterprise social networking system associated with the database system, the CRM records being independent of user profiles of users of the enterprise social networking system, each CRM record associated with a respective one of a plurality of record feeds of the enterprise social networking system, each record feed configured to share CRM record-specific feed items related to the CRM record associated with the record feed, each CRM record capable of being independently subscribed to by users of the enterprise social networking system to cause the CRM record-specific feed items related to the CRM record to be shared in news feeds of the users subscribed to the CRM record;

providing, using the database system, a list stored as or identified using data objects in the database system, the list defined by the user-selected subset of CRM records, the list being an entity independent of the CRM records, the list capable of being independently subscribed to by users of the enterprise social networking system to cause list-specific feed items related to the user-selected subset of CRM records to be shared in news feeds of users subscribed to the list, the list-specific feed items comprising CRM record-specific feed items of the subset of CRM records;

storing, in a database of the database system, identifications of users subscribed to the list;

processing a request, from a second user of the enterprise social networking system, to initiate a following relationship with a first CRM record in the subset of CRM records, the initiation of the following relationship automatically triggering a subscription of the second user to the list;

processing a selection of the list when the list is identified in a user interface on a device associated with the second user;

displaying, responsive to the selection of the list, an enterprise social network feed dynamically populated to contain the list-specific feed items;

processing a further request, from a third user of the enterprise social networking system, to initiate a following relationship with a second CRM record, the second CRM record not being in the subset of CRM records, the third user not being a subscriber to the list;

determining, responsive to processing the further request, that the second CRM record has a parent-child relationship with the first CRM record;

automatically subscribing, responsive to determining that the second CRM record has a parent-child relationship with the first CRM record, the third user to the list;

processing a comment by the third user, the comment relating to a third CRM record, the third CRM record not being in the subset of CRM records; and displaying, on a device of a fourth user of the enterprise social networking system, the comment, the fourth user being a subscriber to the list, the fourth user not having a following relationship with the third user.

11. A method implemented using a database system for providing an enterprise social network feed containing feed items associated with a configurable list of customer relationship management (CRM) records, the method comprising:

processing, using the database system, data identifying a subset of a plurality of CRM records stored as data objects in the database system, each CRM record being related to a respective business task and/or business relationship, the subset of CRM records selected by a first user of an enterprise social networking system associated with the database system, the CRM records being independent of user profiles of users of the enterprise social networking system, each CRM record associated with a respective one of a plurality of record feeds of the enterprise social networking system, each record feed configured to share CRM record-specific feed items related to the CRM record associated with the record feed, each CRM record capable of being independently subscribed to by users of the enterprise social networking system to cause the CRM record-specific feed items related to the CRM record to be shared in news feeds of the users subscribed to the CRM record;

providing, using the database system, a list stored as or identified using data objects in the database system, the list defined by the user-selected subset of CRM records, the list being an entity independent of the CRM records, the list capable of being independently subscribed to by users of the enterprise social networking system to cause list-specific feed items related to the user-selected subset of CRM records to be shared in news feeds of users subscribed to the list, the list-specific feed items comprising CRM record-specific feed items of the subset of CRM records;

storing, in a database of the database system, identifications of users subscribed to the list;

processing a request, from a second user of the enterprise social networking system, to initiate a following relationship with a first CRM record in the subset of CRM records, the initiation of the following relationship automatically triggering a subscription of the second user to the list;

processing a selection of the list when the list is identified in a user interface on a device associated with the second user; and causing display of, responsive to the selection of the list, an enterprise social network feed dynamically populated to contain the list-specific feed items;

receiving criteria for searching a plurality of lists;

causing the plurality of lists to be searched based on the criteria;

processing a further request, from a third user of the enterprise social networking system, to initiate a following relationship with a second CRM record, the second CRM record not being in the subset of CRM records, the third user not being a subscriber to the list;

determining, responsive to processing the further request, that the second CRM record has a parent-child relationship with the first CRM record;

causing, responsive to determining that the second CRM record has a parent-child relationship with the first CRM record, the third user to subscribe to the list;

processing a comment by the third user, the comment relating to a third CRM record, the third CRM record not being in the subset of CRM records; and causing display of, on a device of a fourth user of the enterprise social networking system, the comment, the fourth user being a subscriber to the list, the fourth user not having a following relationship with the third user.

12. The method of claim 11, wherein the criteria is associated with a designated group of users.

13. The method of claim 11, wherein the criteria is associated with a specified user.

14. The method of claim 11, wherein the criteria comprises one or more alphanumeric strings.

15. The method of claim 11, wherein the criteria comprises a numerical quantity.

16. The method of claim 15, wherein the numerical quantity is a number of lists to be displayed in a user interface.

17. The method of claim 15, wherein the numerical quantity is a number of subscribers to the list.

* * * * *